United States Patent
Aoki

(10) Patent No.: US 6,885,119 B2
(45) Date of Patent: Apr. 26, 2005

(54) ELECTRIC ACTUATOR AND STRUCTURE FOR FIXING THE SAME

(75) Inventor: Kazuhiro Aoki, Yamanashi (JP)

(73) Assignee: KITZ Corporation, Chiba (JP)

( * ) Notice: Subject to any disclaimer, the term of this patent is extended or adjusted under 35 U.S.C. 154(b) by 0 days.

(21) Appl. No.: 10/835,069

(22) Filed: Apr. 30, 2004

(65) Prior Publication Data

US 2004/0212260 A1 Oct. 28, 2004

Related U.S. Application Data

(62) Division of application No. 10/221,133, filed as application No. PCT/JP01/01997 on Mar. 14, 2001, now Pat. No. 6,768,234.

(30) Foreign Application Priority Data

| Mar. 14, 2000 | (JP) | 2000-69886 |
| Jul. 4, 2000 | (JP) | 2000-202024 |
| Dec. 29, 2000 | (JP) | 2000-404914 |

(51) Int. Cl.[7] .................................................. H02K 7/10
(52) U.S. Cl. ..................................... 310/78; 251/129.11
(58) Field of Search .............................. 310/75 R, 76, 310/78, 92, 100; 251/129.01–129.19

(56) References Cited

U.S. PATENT DOCUMENTS

| 2,979,089 A | 4/1961 | Piesker ....................... 81/57.11 |
| 4,078,589 A | 3/1978 | Miller ........................ 81/57.14 |
| 4,125,790 A * | 11/1978 | Stratienko ................. 310/75 D |
| 4,822,958 A | 4/1989 | Van Laere ................... 200/1 V |
| 5,295,907 A * | 3/1994 | Akkerman ..................... 464/37 |
| 5,320,507 A * | 6/1994 | Monnier et al. ........... 418/55.6 |
| 5,915,668 A * | 6/1999 | Hodapp et al. ........ 251/129.13 |
| 6,273,200 B1 | 8/2001 | Smith et al. ................ 173/216 |
| 6,376,947 B1 | 4/2002 | Tateishi .................... 310/68 R |
| 6,443,712 B1 * | 9/2002 | Sakai et al. ................. 417/374 |
| 6,768,234 B1 * | 7/2004 | Aoki ........................ 310/68 A |

FOREIGN PATENT DOCUMENTS

| JP | 54-92437 | 6/1979 |
| JP | 60-16074 | 2/1985 |
| JP | 61-177266 | 11/1986 |
| JP | 11-257529 | 9/1999 |

* cited by examiner

*Primary Examiner*—Dang Le
(74) *Attorney, Agent, or Firm*—Wenderoth, Lind & Ponack L.L.P.

(57) ABSTRACT

In an electric actuator having inner component parts thereof inclusive of a motor 1 covered with a cover main body 10, the cover main body 10 having a coating (protection) function serves as a manually operating part and is equipped with a mechanism for switching between electrical and manual operations. A fixing structure for connecting and fixing an electric actuator 40 and a rotary valve 23 includes an annular one-way clutch structure 25 at one of opposite fixing positions, and includes an annular face part 6 disposed at the other of the opposite fixing positions. The annular face part 6 is inserted into the one-way clutch structure 25, thereby restraining the actuator and valve from being rotated in one circumferential direction.

7 Claims, 25 Drawing Sheets

ELECTRIC ACTUATOR AND STRUCTURE FOR FIXING THE SAME

This is a divisional application of U.S. application Ser. No. 10/221,133, filed Sep. 10, 2002, now U.S. Pat No. 6,768,234, which is a National Stage of International Application No. PCT/JP01/01997 filed Mar. 14, 2001.

TECHNICAL FIELD

The present invention relates to an electric actuator mounted on a rotary valve, such as a ball valve, butterfly valve, etc., and to a fixing structure for detachably attaching the electric actuator to the rotary valve through a single touching action, which structure is applicable to a fixing structure for machine parts.

BACKGROUND ART

Actuators of this type are generally adapted to automatically open and close a valve with a structure in which a motor-driving shaft provided inside the actuator and a valve stem are connected directly or through a clutch mechanism. During power breakdown or in case of emergency, however, manual operation to open and close the valve is required.

Manual operation has heretofore been performed through a method of attaching a separate, manually operating shaft to a clutch mechanism, a method of projecting a motor-driving shaft from the upper or lower part of an actuator cover and using a tool to manually operate the projecting part of the motor-driving shaft, or a method of forming a hole in a motor-driving shaft and a projection on a valve stem, or vice versa, and inserting a tool into the hole to perform manual operation (see JP-A SHO 60-16074 (UM) and JP-A SHO 61-177266 (UM), for example).

On the other hand, there is a case where a valve or an actuator is generally provided with a flange or tapping seat as means for mounting the actuator on and connecting it to the shaft-mounting portion of the valve, and the actuator and shaft-mounting portion are fastened to each other with bolts or other such means (see JP-A SHO 54-92437 (UM), for example).

However, the conventional manually operating mechanisms for electrically operated actuators are complicated in structure and are large-sized in overall shape, and the manual operation is generally made using a tool to deteriorate operability. Therefore, demand is raised for development of electrically operated actuators that can solve the aforementioned problems. Since holes for bolts formed in a flange of an actuator of this type or valve have a slightly larger diameter than the bolt outside diameter in view of a fitting tolerance in relation to the bolts, when the bolts are loosened in attaching the actuator to or detaching it from the valve, there is a possibility of the actuator being shift by the amount of a gap between the bolts and the bolt holes. This fails to securely maintain the completely closed state when a rotary valve is required to completely close, resulting in a malfunction of the valve. In addition, when the flange is to be tapped, this requires an additional tapping work and necessitates a space for rotating and loosening the bolts in attaching or detaching the actuator and an operation tool, such as a wrench, screwdriver or other such means. Therefore, demand is also raised at the same time for development of a fixing configuration in the electrically operated actuator that can solve these problems.

The present invention has been developed in view of this state of affairs, and its object is to inexpensively provide a compact, electrically operated actuator simple in structure, light in weight and safe in operation. Another object is to provide an electrically operated actuator attachable to and detachable from a rotary valve by a single operation, and a fixing configuration for the actuator. A further object is to provide a fixing configuration for firmly fixing an electrically operated actuator with the rotational direction and axial direction of a rotary valve restrained, and a compact fixing structure capable of firmly fixing an electrically operated actuator with ease and applicable also to mechanical parts.

SUMMARY OF THE INVENTION

To attain the above objects, the present invention provides an electric actuator having inner component parts thereof inclusive of a motor covered by a cover main body. The cover main body has a coating (protection) function and serves as a manually operating part, and is equipped with a mechanism for switching between electrical and manual operations.

In the electric actuator of the invention, the cover main body is cylindrical and is provided on a disk-shaped base body on which the inner component parts inclusive of the motor are mounted, and the cover main body is made of a synthetic resin and has an outer face formed integrally with a fastening curved face so that the cover main body is capable of being gripped.

In the electric actuator of the invention, the switching mechanism comprises a fastening pin, an apex of which is elastically energized outward in a lateral part of a base body, and a fastening groove of an annular projection disposed on an inner peripheral face of the cover main body, the apex being separably fastened to the fastening groove. The annular projection is inserted into an annular groove formed in the lateral part of the base body to prevent the cover main body from being moved in a vertical direction relative to the base body.

In the electric actuator of the invention, the motor has a fastening projection, and the cover main body has a fastening depression formed on an inner peripheral face thereof, whereby an electrically operable state of the motor is established by causing the fastening projection to be engaged with the fastening depression and causing the apex of the fastening pin to be engaged with the fastening groove of the annular projection. The fastening projection of the motor is fixed in the fastening depression formed on the inner peripheral face of the cover main body, and the apex of the fastening pin engaged with the fastening groove of the annular projection is depressed to cancel the state of engagement, thereby rendering the cover main body manually rotatable in conjunction with the motor and parts attached to the motor.

In the electric actuator of the invention, the motor has a drive shaft to which a valve opening plate is fixed. The valve opening plate has a surface to which a display part is applied, the cover main body has an inspection window disposed therein, and the indicating part is adapted to be visually observed through the inspection window. The base body has an opening display piece fixed thereto, and the display part of the valve opening plate is positioned below the opening display piece to enable display on the opening display piece to be visually observed through the inspection window in the cover main body during manual operation of the electric actuator.

The electric actuator of the invention further comprises an interlock switch adapted to effect automatic interruption of supply of electricity to the motor during manual operation of the electric actuator. The interlock switch is disposed on the base body and has a working piece, the cover main body has a depression or a projection disposed on the inner peripheral face thereof, and the working piece is adapted to contact the depression or projection to induce operation of the interlock switch in consequence of rotation of the cover main body.

In the present invention, while an annular clutch is disposed in a gear tube of a rotary valve, the drive shaft of a motor having the lower end connected to the stem of the rotary valve is inserted into a fitting tube of a base body and, at the same time, the fitting tube is inserted into the clutch so as to restrain the rotation of the rotary valve and actuator.

In the invention, the clutch restrains the rotation of the rotary valve and actuator in one direction, and a stopper part disposed on the lateral face of the gear tube is made to collide with a colliding face formed on the base body of the actuator so as to restrain the rotation of the rotary valve and actuator in the other direction. In addition, a stopper pin mechanism disposed in the base body is fastened to the lower surface of a stopper part to prohibit the rotary valve and electric actuator from producing relative motion in the vertical direction.

According to the present invention, therefore, the cover main body manifests a coating (protection) function for ordinary actuators as well as a function of protecting inner parts of the actuator and preventing invasion of water, dust and the like. Furthermore, when gripped, the cover main body has a function of a handle for readily performing manual operation. Moreover, switching between electric and manual operations can be attained. For these reasons, it is possible to reduce the cost to a great extent and, since piping and assembling works or maintenance can be enhanced, further reduction in cost can be attained.

A conventional manual operation mechanism requires a large operation force because the manual operation is performed against the motor gear. However, according to the manual operation mechanism of the present invention, manual operation can be performed with a small operation force because the motor made integral with the drive shaft is manually operated via the cover main body.

Further, according to the present invention, an interlock mechanism actuates during manual operation of the actuator to prevent the motor from driving, thereby enabling risk prevention to provide an actuator excellent in safety.

Further, according to the present invention, the annular clutch mechanism is used to prevent the actuator from moving in the rotation direction, and the stopper pin mechanism is used to prevent the actuator from being extracted. Thus, the electric actuator can easily be attached or detached with one stroke.

According to another aspect of the present invention, there is provided a fixing structure for an electric actuator, wherein an annular one-way clutch structure is disposed at a fixing position for the rotary valve that is one of the constituent members. An annular face part is disposed at a fixing position for the electric actuator that is the other constituent member, and is inserted into the one-way clutch structure, thereby restraining the pair of constituent members from rotating one circumferential direction.

The invention further provides a fixing structure wherein the annular one-way clutch structure has a roller clutch structure, another fixing structure having a fastening mechanism provided on the rotary valve and electric actuator for restraining the rotation of the one-way clutch structure and restraining the opposite rotation thereof, and still another fixing structure using a stopper pin mechanism to restrain the rotary valve and electric actuator from moving in the axial direction.

According to the present invention, therefore, it is possible to reliably restrain the rotation direction when the constituent members are to be fixed, without a possibility of producing any deviation in the rotation direction. Moreover, since the number of processing and assembling steps is small, the cost can be reduced.

Furthermore, since the annular one-way clutch structure has a roller clutch structure, the overall structure can be made compact.

Thus, the compact, inexpensive structure is used to reliably restrain the rotation direction and axial direction, and the fixing operation can be effected with extreme ease.

Even for a pair of constituent members to which a rotation force is imparted, such as a fixing structure for a rotary valve and an electric actuator, it is possible to easily perform fixation in the rotation direction and vertical (axial) direction.

When applying this fixing structure to an electric actuator mounted on a rotary valve, the attachment and detachment thereof are easy to perform without the use of any tool. Moreover, the completely closing function in the rotary valve can be attained over a lone period of time. In addition, this fixing structure is applicable as fixing means for mechanical parts, thus attaining a wide range of applications.

DETAILED DESCRIPTION OF THE INVENTION

To depict this invention more specifically, it will be described below with reference to the accompanying drawings.

Figure 1:
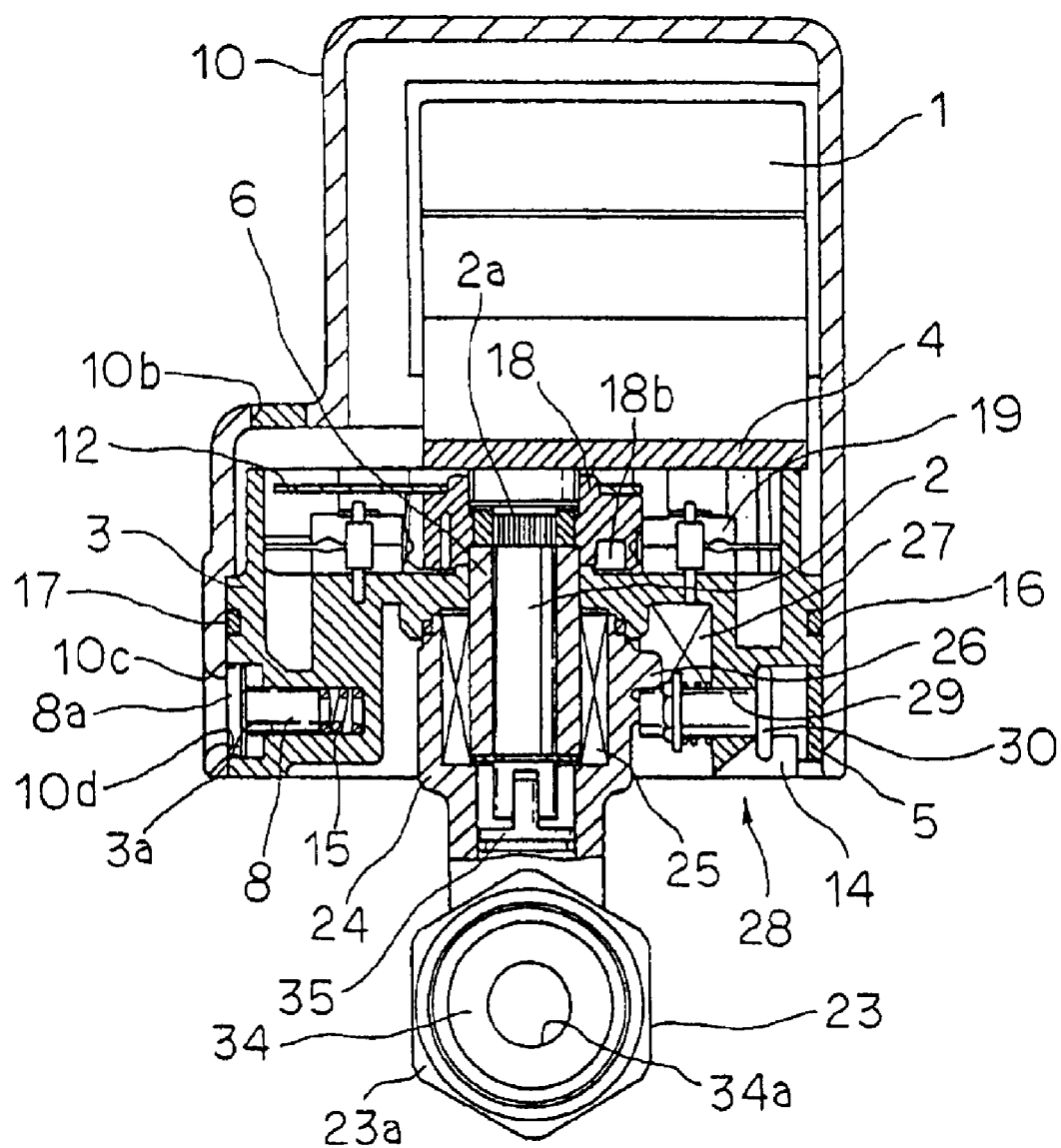
FIG. 1 is a longitudinally sectioned side view illustrating the state of an electric actuator contemplated by this invention being fixed to a ball valve.

One example of the application of the electric actuator contemplated by this invention to a rotary valve, such as a ball valve, will be described based on the drawings. With reference to FIG. 1, a drive shaft 2 of a motor 1 is pivotally mounted rotatably on a base body 3 formed in the shape of a disk. This motor 1 is a geared motor that has built therein a reducer having a high gear ratio. This geared motor, during the absence of power supply, fulfills the function of self-locking the drive shaft 2. In this case, the drive shaft 2 rotates jointly with the motor 1.

Figure 12:
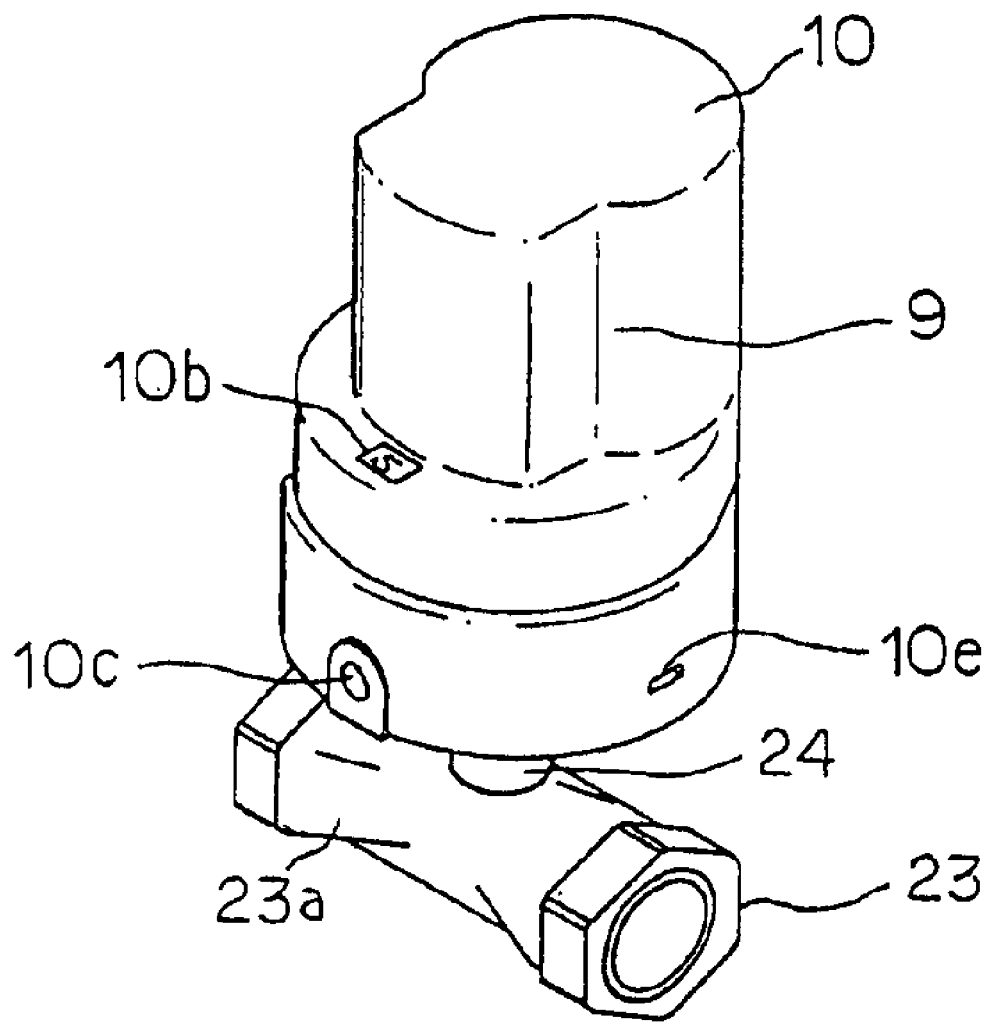
FIG. 12 is a perspective view illustrating the state of the electric actuator contemplated by this invention being fixed to the ball valve.

A cover main body 10 is furnished, as illustrated in FIG. 12, with such a fastening curved surface 9 as renders the outer face thereof easy to grip. This cover main body 10 is molded of a synthetic resin in a one-piece structure of a container resembling a manual gas tap in shape. The cover main body 10, by being disengaged from a fastening pin 8 built in the base body 3 as described specifically herein below, can be manually operated at an angle within a specific range of 180 degrees or 90 degrees, for example.

With reference to FIG. 1, the engaging pin 8 is inserted in an inserting groove 3a disposed in the lower part of the base body 3 through an outwardly elastically energized spring 15. This engaging pin 8 is prevented from flying out of the cover main body 10 by having an apex 8a of the engaging pin fastened to a fastening groove 5b of a collar 5 fulfilling the role of an annular projection as described specifically herein below, and also having the apex 8a pressed down by a fastening surface 10d forming an inner peripheral face of the cover main body 10.

Figure 19:
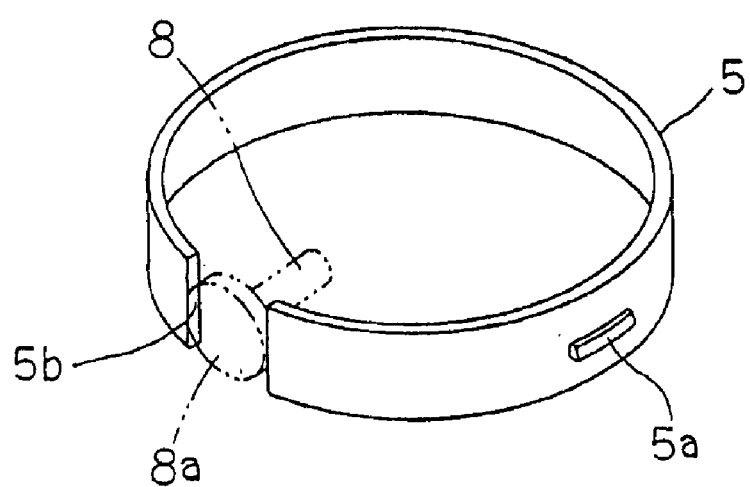
FIG. 19 is a referential perspective view illustrating a collar.

With reference to FIG. 19, the collar 5 is provided with a fastening groove 5b, and is formed in a shape having a cross section of the letter C. In the present case, it is joined fast with the cover main body 10 by causing projections 5a formed at not less than two points on the outer periphery of the collar 5 to be meshed with fitting parts 10e of the cover main body 10. At the time that the cover main body 10 (which has incorporated the collar 5 therein) is integrated with the base body 3, the collar 5 is inserted into and meshed with a groove 3b formed annularly along the outer periphery of the base body 3 as illustrated in FIG. 2, and the cover main body 10 is consequently restrained so as not to move in the longitudinal direction of the base body 3.

Figure 14:
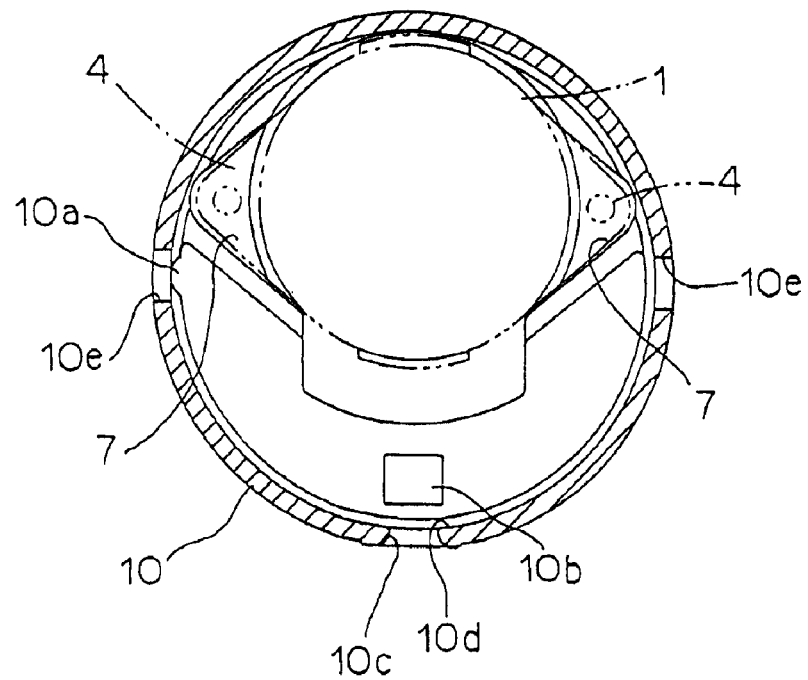
FIG. 14 is an explanatory diagram illustrating the state of the cover having a motor inserted therein.
Figure 15:
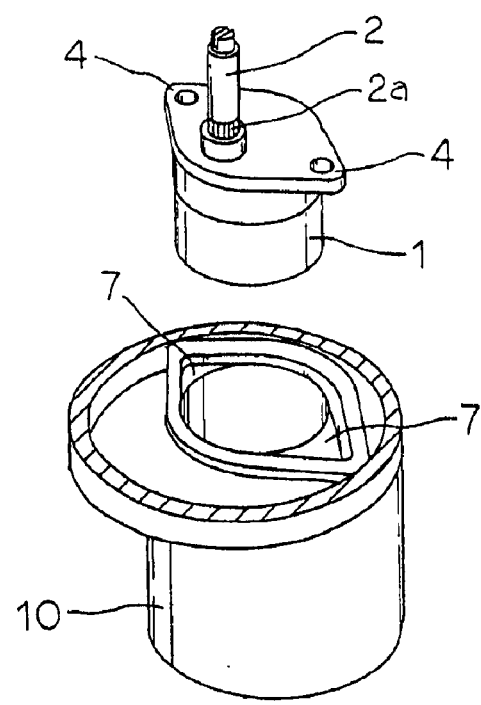
FIG. 15 is a perspective view illustrating a fastening projection of the motor and a fastening depression of the cover main body as viewed from the downward direction.
Figure 16:
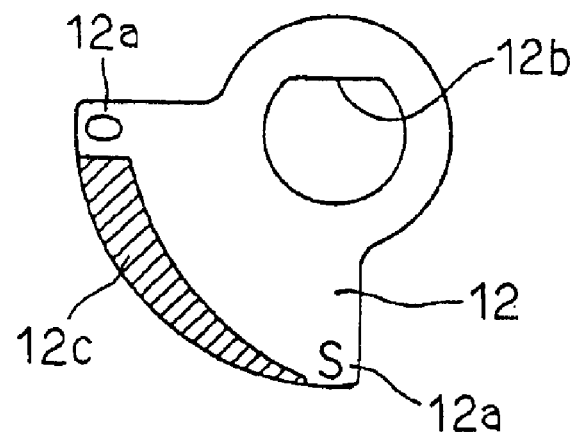
FIG. 16 is a plan view illustrating a movable valve opening plate.
Figure 17:
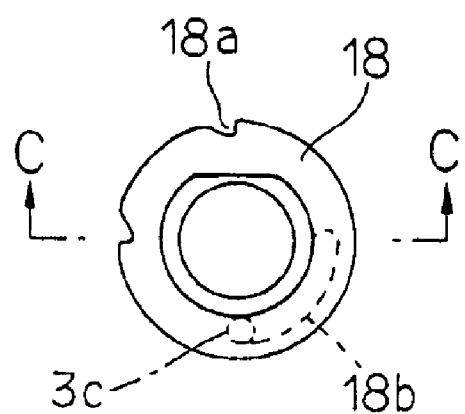
FIG. 17 is a front view of a cam.
Figure 18:
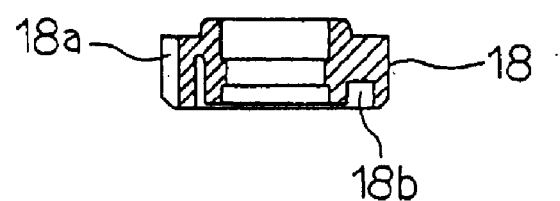
FIG. 18 is a cross section taken through FIG. 17 along line C—C.

With reference to FIG. 14, fastening projections 4, 4 are formed on the opposite sides of the base part of the motor 1 so as to fix the motor 1 to the cover main body 10 by causing these fastening projections 4 to be meshed with fastening depressions 7, 7 formed integrally in the inner peripheral face of the cover main body 10. When the motor 1 is set in motion, the drive shaft 2 is rotationally driven.

When the cover main body 10 is manually rotated, the motor 1, fastening projections 4, drive shaft 2 and the parts disposed on the drive shaft 2 are adapted so as to be rotated by accompanying the rotation of the cover main body 10.

Figure 2:
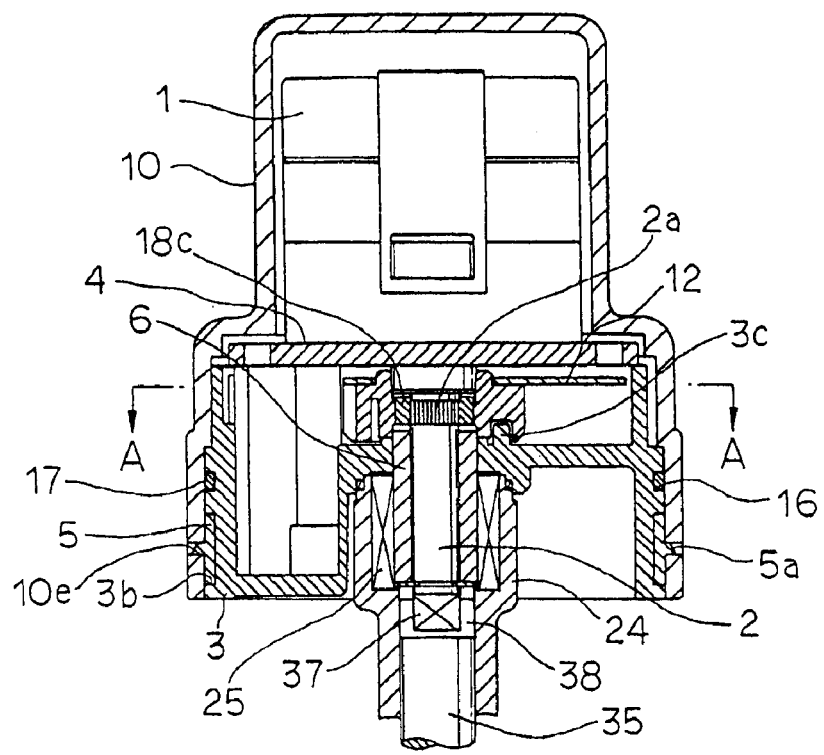
FIG. 2 is a partially cutaway, longitudinally sectioned front view of FIG. 1.

With reference to FIG. 1 and FIG. 2, reference numeral 16 denotes an annular insertion groove which is formed in the outer peripheral lateral face of the base body 3 so that the cover main body 10 is enabled by having an O ring 17 set in the insertion groove 16 to acquire and retain the sealing property.

Further, a cylindrical resinous cam 18 is pivotally mounted non-rotatably on and joined fast to the upper part of the drive shaft 2 so as to be rotated jointly with the drive shaft 2. Then, depressions (or projections) 18a are formed on the outer peripheral face of the cam 18 at angular intervals of 180 degrees or 90 degrees, and two or three limit switches 19 are arranged (or superposed) at a proper interval on the upper face of the base body 3 so as to be applied to a two-way valve or a three-way valve. Thus, due to the rotation of the cam 18, the contact points of the limit switches 19 collide with the depressions 18a of the cam 18 to perform an electrical switch. Due to this electrical contact, the electric motor 1 can be driven in a predetermined angle or brought to a stop.

Further, notches are cut in the lower face of the cam 18 at the same angular interval as the depressions 18a to form guide grooves 18b.

Figure 7:
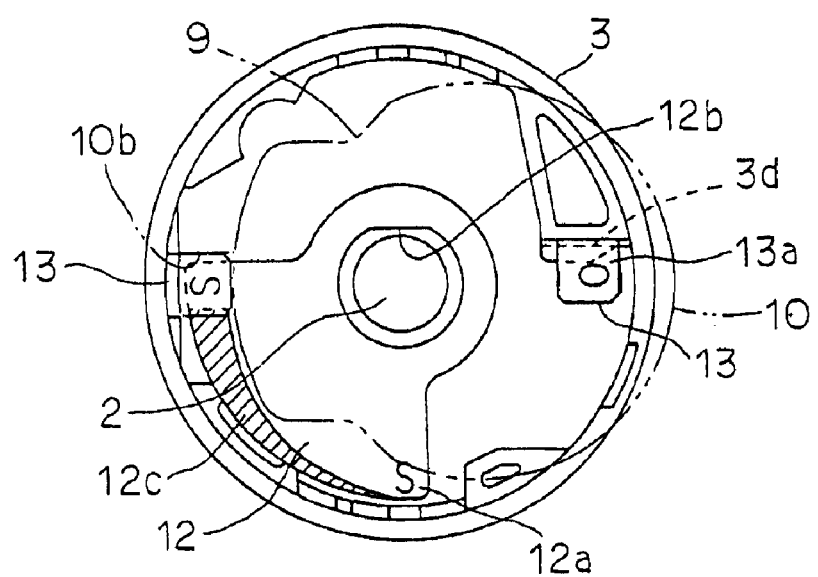
FIG. 7 is an explanatory diagram illustrating the state assumed by the opening plate after completing a rotation of about 90 degrees.
Figure 8:
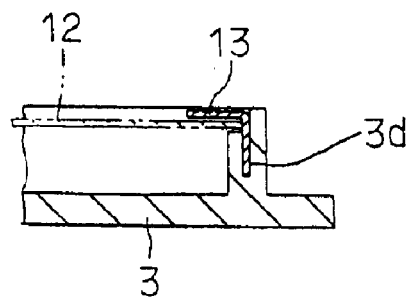
FIG. 8 is a cross section taken through FIG. 6 along line B—B.

With reference to FIG. 2 and FIG. 7, projecting pins 3c disposed on the upper face of the base body 3 are meshed with the guide grooves 18b formed on the seating face of the base body 3 at an angular interval of about 90 degrees (or 180 degrees) and are then guided at a predetermined angle of rotation and eventually brought to a stop at the opposite terminals of the guide grooves 18b.

Figure 9:
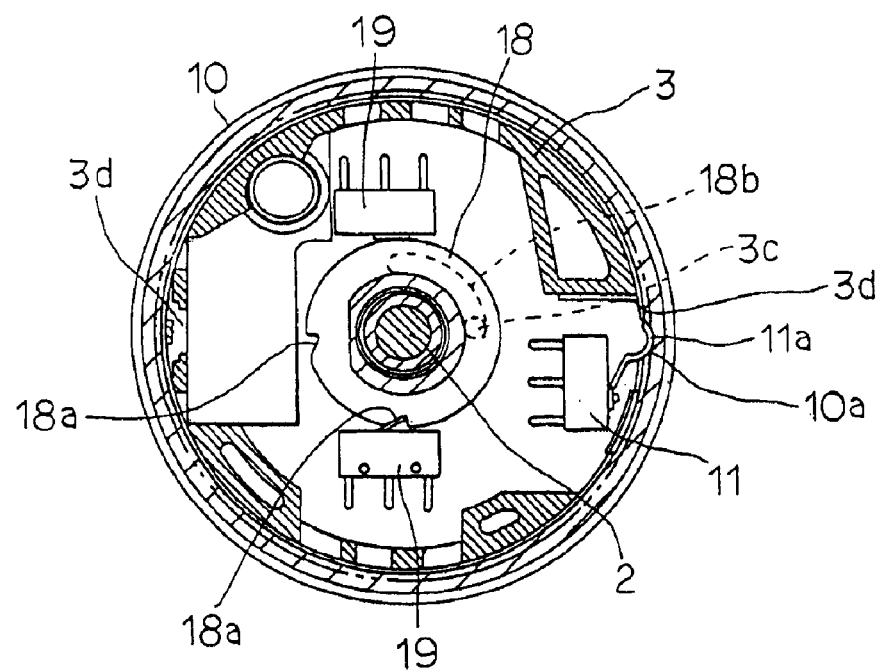
FIG. 9 is a cross section taken through FIG. 2 along line A—A.
Figure 10:
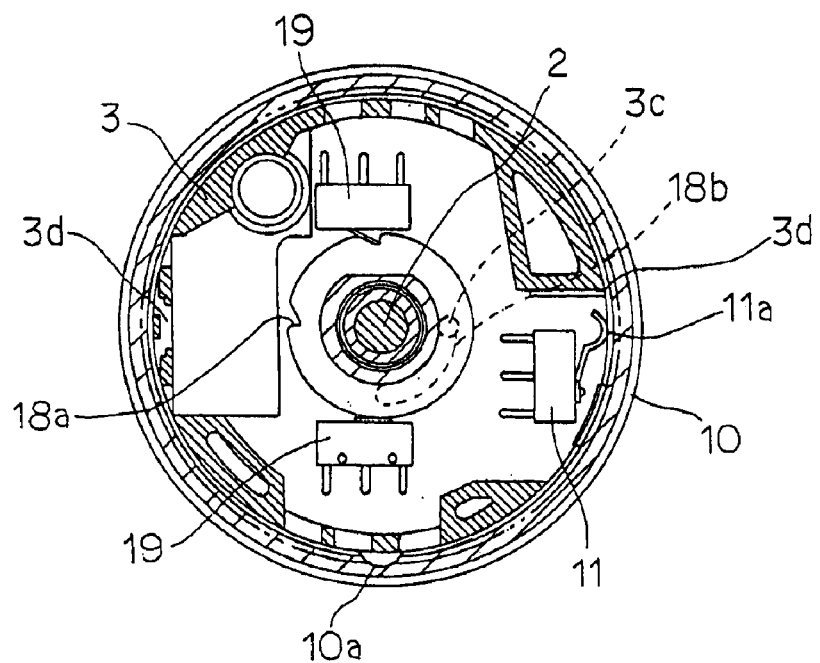
FIG. 10 is a cross section illustrating the cover of FIG. 9 in a rotated state.
Figure 11:
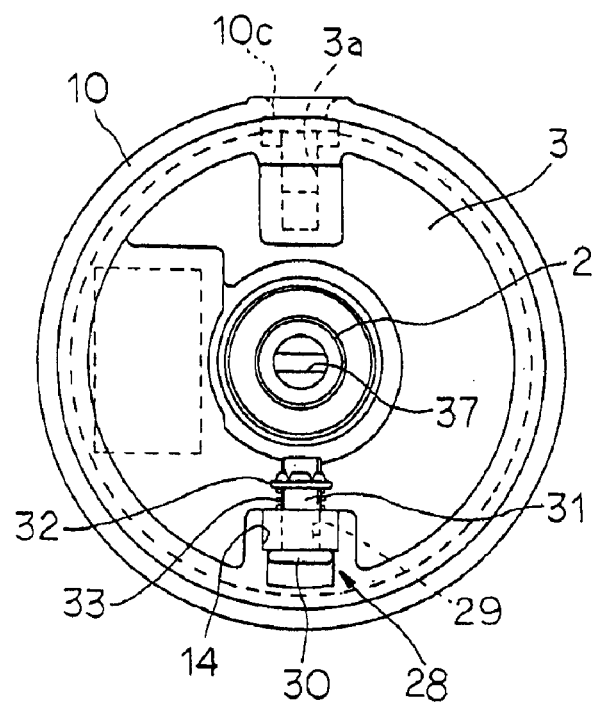
FIG. 11 is a bottom view of the electric actuator contemplated by this invention.

Then, with reference to FIG. 9, by forming an arcuate depression (or projection) 10a on the inner peripheral face of the cover main body 10 and causing a working piece 11a of an interlock switch 11 to engage the depression 10a, it is possible to enable the working piece 11a, when the cover main body 10 is manually rotated, to be disengaged from the depression 10a and allowed to turn on the interlock switch 11, effect automatic interruption of the power supply to the motor 1, prevent the motor 1 from being actuated randomly during the manual rotation thereof, and consequently preclude the manual rotation from incurring any danger.

Figure 6:
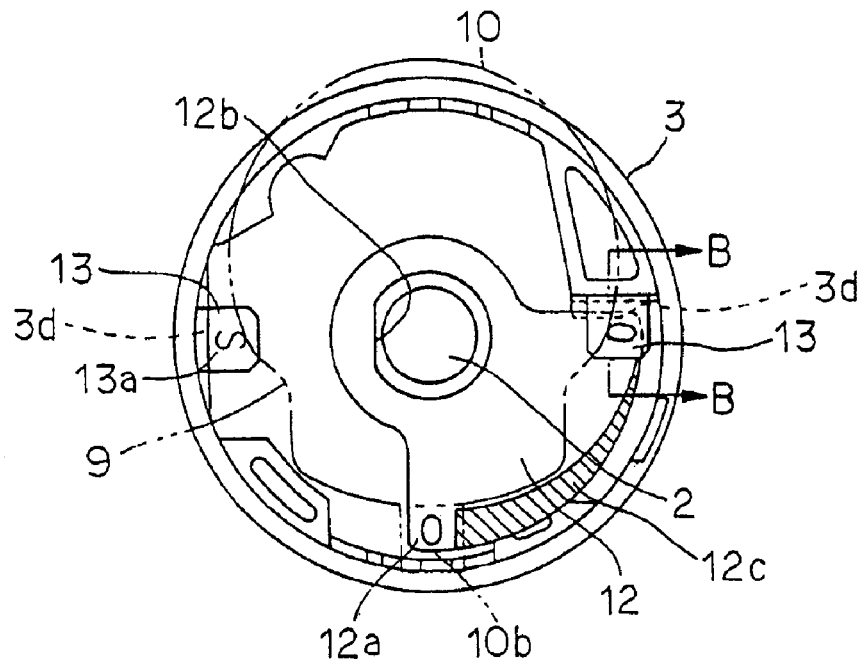
FIG. 6 is an explanatory diagram illustrating the state assumed by an opening plate.

With reference to FIG. 6, reference numeral 12 denotes a valve opening plate, and this plate 12 is inserted non-rotatably in the cam 18 through the medium of a flat part 12b so as to be rotated jointly with the cam 18. Then, a knurled part 2a of the drive shaft 2 is pressed in and joined fast to a ring 18c formed as inserted in the inner peripheral face of the cam 18. Further, the plate 12 and an opening display piece 13 are respectively provided with display parts 12a and 13a, respectively, for showing the states of display of O (open) and S (shut) and the opening display piece 13 is joined fast to a fastening part 3d formed by cutting notches in the base body 3.

Further, the plate 12 is provided on the surface thereof along the direction of opening with an opening arrow mark part 12c that is formed by applying thick lines.

The positional relation between the valve opening plate 12 and the opening display piece 13 is such as to dispose the opening display piece 13 above the valve opening plate 12 so that when the valve opening plate 12 is manually rotated to the state illustrated in FIG. 6, for example, the display of S on the valve opening plate 12 is hidden under the display of O on the opening display piece 13. However, when the valve opening plate 12 is rotated clockwise in an angle of 90 degrees and brought to the state illustrated in FIG. 7, the display of O on the valve opening plate 12 is hidden under the display of S on the opening display piece 13.

When the valve opening plate 12 is further rotated at an angular interval of 90 degrees, for example, by the operation of the motor 1, the display part 12a of O or S can be made visually discernible from outside through an inspection window 10b made of a transparent plate and disposed in the cover main body 10.

Now, the construction for attachment and detachment of the actuator to and from the rotary valve will be described below.

An annular one-way clutch (roller clutch) 25 is disposed in a gear tube 24 of a rotary valve 23, such as a ball valve or a butterfly valve, as illustrated in FIG. 1. A fitting tube 6 penetrated by the drive shaft 2 is inserted into this clutch 25 so as to restrain the rotation thereof in one direction, and a stopper part 26 disposed on the lateral face of the gear tube 24 is shaped to collide with a colliding face 27 formed on the base body 3 so as to restrain the rotation of the drive shaft 2 in the other direction.

Figure 13:
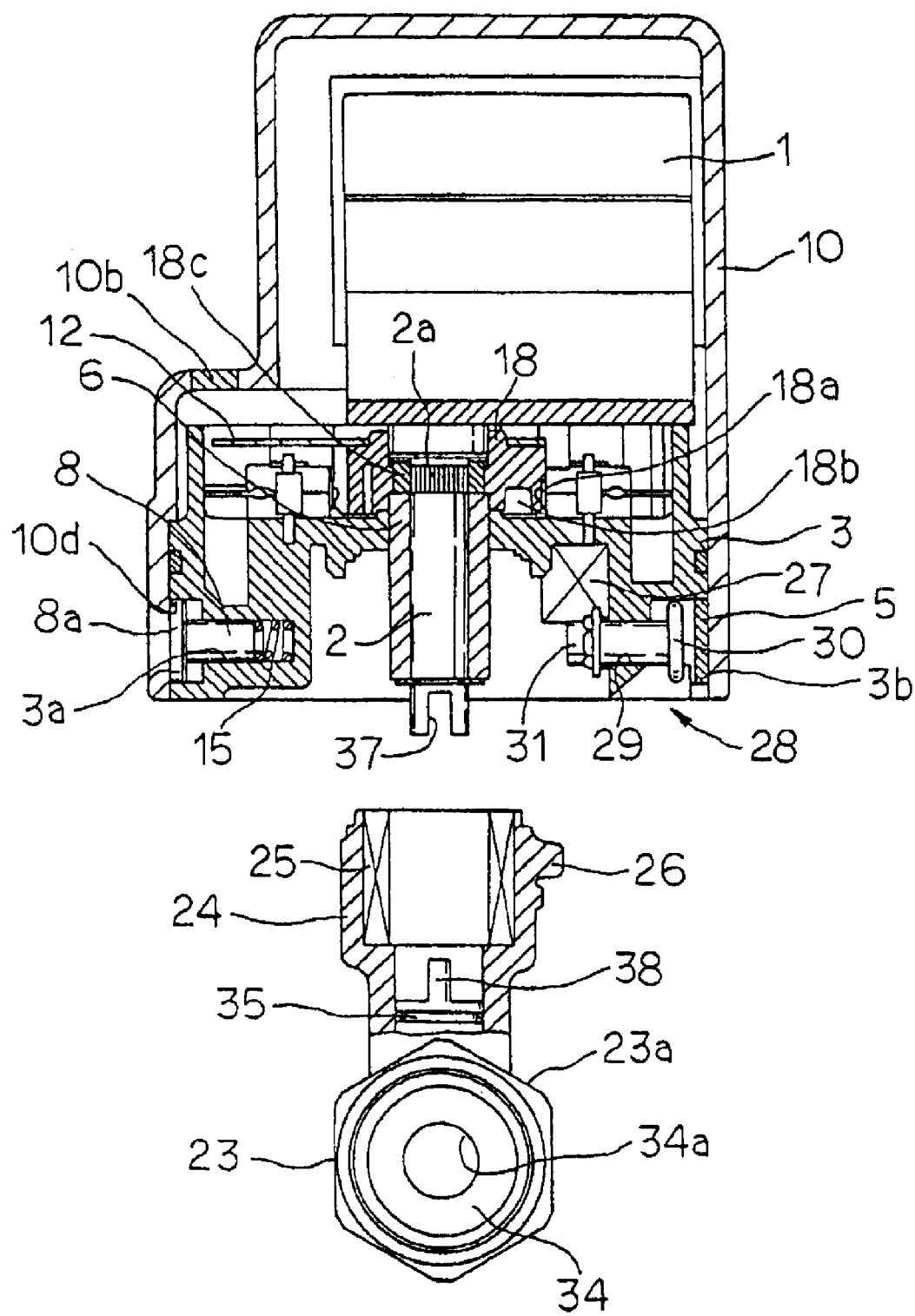
FIG. 13 is a longitudinally sectioned side view illustrating the electric actuator of FIG. 1 in a separated state.

A stopper pin mechanism 28, with reference to FIG. 1 and FIG. 13, is disposed in an insertion hole 29 formed in the lower part of the base body 3 in a withdrawable manner through a spring 33 energized by having mounted on a fitting plate 32 a stopper pin 31 furnished at the outer terminal thereof with a head part 30, and the leading terminal part of this stopper pin 31 is fastened to the stopper part 26 so as to prohibit the rotary valve 23 and the electric actuator from moving relative to each other in the vertical direction. When the stopper pin 31 is withdrawn outward, the stopper pin 31 can be released from the stopper part 26 and, in the ensuant state, the electric actuator can be removed from the rotary valve with one stroke.

The stopper pin mechanism 28, on allowing the stopper part 26 to assume a position to collide with the colliding face 27, is set at a position enabling the leading terminal part of the stopper pin 31 to be fastened to the lower face of the stopper part 26. The stopper pin 31 is set in the electric actuator so as to be covered by the collar 5 and the cover main body 10, and the base body 3 is provided in the bottom part thereof with an opening 14 for permitting operation of the stopper pin mechanism 28. Specifically, the stopper pin mechanism 28 is operated with a tool inserted through the opening 14.

In the diagram, reference numeral 34 denotes a ball which is disposed inside a body 23a of the ball valve (a rotary valve) and furnished with a through hole 34a, and reference numeral 35 denotes a stem. The ball 34 and stem 35 are adapted so as to be joined by fitting a projecting concave dihedral part 38 formed at the upper terminal of the stem 35 with a receding convex dihedral part 37 disposed at the lower terminal of the drive shaft 2.

Though the use of the geared motor has been described as a means to self-lock the drive shaft 2 to the motor during the absence of power supply, this means does not need to be limited to the geared motor. It is allowable to use a clutch structure or an electric brake instead.

Now, the operation of the working example cited above will be described.

First, as the electric actuator is driven, the drive shaft 2 of the motor 1 begins to rotate and sets the stem 35 of the ball valve 23 rotating. Meanwhile, by causing the cam 18 to impart such a motion to the limit switch 19 as to extend the path of power flow to the motor 1, it is possible to rotate the ball 34 of the ball valve 23 to a predetermined degree of valve opening and bring it to a stop at the position of valve closure.

In this case, the fastening projections 4, 4 disposed on the basal part of the motor 1 are fastened respectively to the fastening depressions 7, 7 of the cover main body 10, the motor 1 is fixed to the base body 3 through the cover main body 10 and consequently capable of rotating the driving shaft. Further, the projecting pin 3c is drawn out of the base body 3 and fastened to the guide groove 18b disposed at a predetermined angle of rotation on the lower face of the cam 18 and guided in the guide groove 18b.

Figure 3:
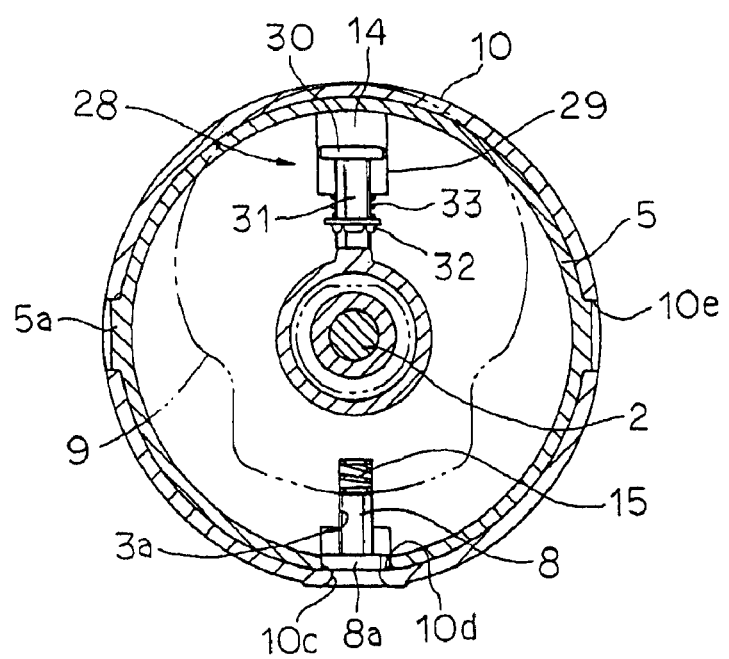
FIG. 3 is a schematic explanatory diagram illustrating the state of a fastening pin.
Figure 4:
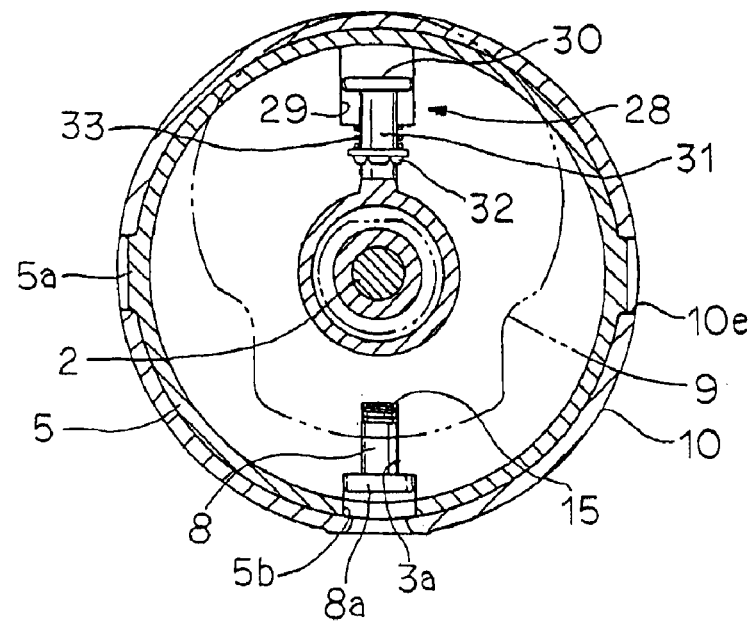
FIG. 4 is a schematic explanatory diagram illustrating this fastening pin in a depressed state.
Figure 5:
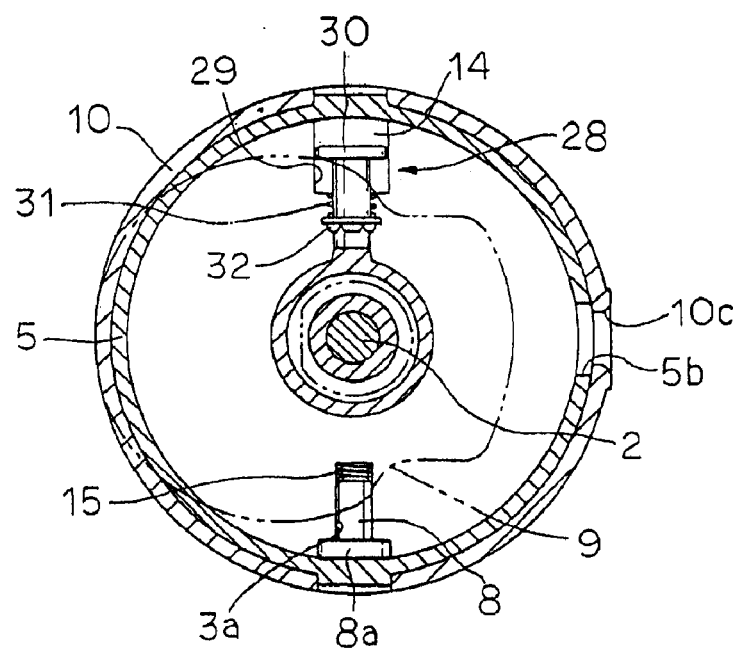
FIG. 5 is a schematic explanatory diagram illustrating a cover of FIG. 4 in a rotated state.

Subsequently, when the electric actuator needs to be manually operated (as in the case of an emergency due to power failure), a tool introduced through a perforated part 10c provided laterally across the cover main body 10 as illustrated in FIG. 3 is manipulated to press the fastening pin 8 to the position illustrated in FIG. 4 and rotate the cover main body 10. Thus, the fastening pin 8 will be compacted into the base body 3 in spite of the pushing force of the spring 15, the apex 8a of the fastening pin 8 will be released from the fastening groove 5b of the collar 5, and the collar 5 will be guided by a groove 3b in the outer peripheral face of the base body 3 and enabled to render the cover main body 10 fit for manual operation. In other words, a tool applied against a fastening mechanism, including pin 8, spring 15, and fastening groove 5b of collar 5, allows manual operation of the valve by turning the cover main body 10.

While this manual operation is in process, the fastening projections 4, 4 of the motor 1 and the fastening depressions 7, 7 of the cover main body 10 are brought into a mutually fastened (engaged) state and the motor 1 and the drive shaft 2 are consequently rotated jointly to open and shut the rotary valve 23. In this case, the manual operation remains effective until the projecting pin 3c provided on the base body 3 is guided by the guide groove 18b of the cam 18 in consequence of the rotation of the motor 1 and eventually fastened to the stopper parts at the opposite terminals of the guide groove 18b at an angle within a predetermined range of 180 degrees or 90 degrees, for example. Thus, the manual operation of the rotary valve 23 can be performed in angles within the predetermined range.

When the rotation of the cover main body 10 is started during the manual operation mode, the outer terminal of the working piece 11a of the interlock switch (a limit switch) 11 departs from the depression 10a disposed in the inner peripheral face of the cover, and the working piece 11a tilts (is pushed) toward the interior of the base body 3 and the limit switch 11 turns on. Since this switch 11 is adapted so as to block the power supply to the motor 1 when it is turned on, the possibility of the motor 1 being erroneously put to operation during the manual operation of the actuator is nil.

Then, when the cover main body 10 is rotated until the perforated part 10c thereof and the fastening pin 8 are aligned, the fastening pin 8 is moved by the pushing force of the spring 15 in the direction of the perforated part 10c, the apex 8a of the fastening pin 8 is positioned within the fastening groove 5b of the collar 5, and the apex 8a is made to collide with the fastening face 10d on the inner peripheral side of the perforated part 10c. As a result, the fastening pin 8 can fix the cover main body 10 to the base body 3 and consequently permit return of the state of power supply.

Incidentally, a limit switch 19 is adapted to start operating and stop the motion of the valve immediately before the projecting pin 3c of the base 3 collides against the terminal part of the guide groove 18b during the presence of power supply.

Now, the display of the valve opening will be described below. At the position depicted in FIG. 6 during the power supply, the display part 12a indicating the state of valve opening (O) can be visually discerned through the inspection window 10b formed in the cover main body 10. Subsequently, when the motor 1 is connected to the power source and the drive shaft 2 is rotated clockwise an angle of 90 degrees for the purpose of causing the valve to assume a shut state, the valve opening plate 12 is jointly rotated with the drive shaft 2 and, in this position, the opening arrow mark part 12c is displayed in the inspection window 10b. When the valve eventually reaches the shut state, the drive of the motor 1 through the limit switch 19 is stopped and the display part 12a indicating the shut state (S) of the valve opening plate 12 can be visually discerned. Since the opening arrow mark part 12c is formed on the surface of the valve opening plate 12 as described above, the open/shut state of the valve can be continuously discerned and confirmed by means of the inspection window 10b.

Subsequently, during the manual operation, the cover main body 10, motor 1, drive shaft 2, cam 18 projecting into the drive shaft and valve opening plate 12 fixed to the cam 18 are made to rotate jointly by depressing the fastening pin 8 until it is released from the state of fastening. Then, in the state depicted in FIG. 6, rotating the cover main body 10 clockwise for the purpose of causing the valve to assume a shut state, the cover main body 10, motor 1, drive shaft 2, cam 18, and valve opening plate 12 are wholly rotated clockwise and the display of the display part 12a indicating the open state (O) is continuously rotated across the inspection window 10b. At the time that the projecting pin 3c of the base body 3 eventually collides against the terminal part of the guide groove 18b of the cam 18 and the cover 10 is no longer allowed to continue its rotation, the display part 12a in the open state (O) of the valve opening plate 12 assumes a position below the display part 13a in the shut state (S) of the opening display piece 13 as illustrated in FIG. 7 and the shut state of the display part 13a can be visually discerned through the inspection window 10b.

The manual operation to change this shut state to the open state is attained by rotating the cover main body 10 counterclockwise until the fastening pin 8 is fastened to the cover main body 10. When this change is completed, the inspection window 10b allows visual recognition of the display part 12a indicating the open state (O) of the valve opening display plate 12.

Meanwhile, when the valve is in a shut state during the mode of power supply, namely when the valve is in the state shown in FIG. 6 and the valve opening display plate 12 is in the position shown in FIG. 7 and the display part 12a in the shut state (S) of the valve opening plate 12 is visually discerned through the inspection window 10b of the cover main body 10, the impartation of an open state to the valve by the manual operation is attained by depressing the fastening pin 8 until the cover main body 10 is released from the fastened state and then rotating counterclockwise the cover main body 10 and consequently inducing the valve opening display plate 12 to rotate simultaneously. After this rotation of the plate 12 continues through an angle of about 90 degrees, the guide groove 18b of the cam 18 and the projecting pin 3c are brought to a stop by the manifestation of a stopper function. At the same time, the display part 12a in the shut state (S) of the valve opening display plate 12 is made to assume a position below the display part 13a in the open state (O) of the opening display piece 13, and the inspection window 10b of the cover main body 10 which has been rotated reveals visual confirmation of the shut state (S) of the display part 13a as illustrated in FIG. 6.

Now, the stopper pin mechanism 28 will be described below. When the gear tube 24 is rotated somewhat in the direction of rotation of this tube until the stopper part 26 of the gear tube 24 collides against the colliding face 27 of the base body 3, the electric actuator is prohibited from continuing its motion in the direction of rotation. At the same time, the leading terminal of the stopper pin 31 is fastened to the lower face of the stopper part 26 and consequently able to infallibly prohibit the electric actuator from continuing its motion in the vertical direction.

When the stopper pin 31 is extracted through the opening 14 formed in the bottom part of the base body 3 and consequently released from being fixed in the upward direction for the purpose of removing the electric actuator, the electric actuator as seated on the base body 3 can be extracted as a unit upward through the gear tube 24. Thus, the electric actuator can be attached to and detached from the valve easily with one stroke.

Now, another example of the application of the electric actuator contemplated by this invention to a rotary valve, such as a ball valve, will be described in detail below with reference to the drawings. Like parts found in the present example and in the preceding example as well will be denoted by like reference numerals and will be omitted from the description given below.

Figure 20:
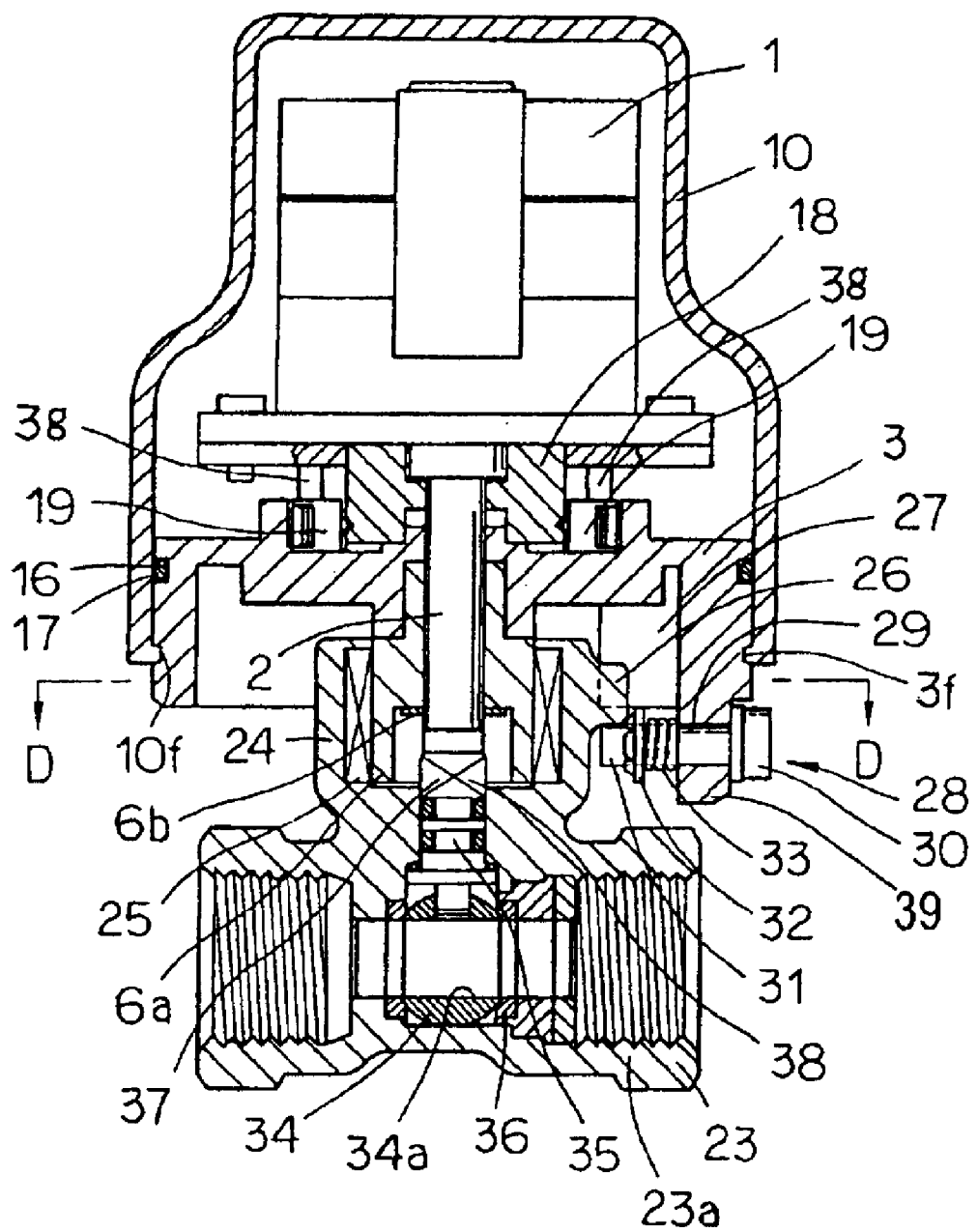
FIG. 20 is a longitudinally sectioned front view illustrating another example of the state of manual operation performed on the electric actuator contemplated by this invention, which actuator is fixed to the ball valve.

With reference to FIG. 20, the drive shaft 2 of the motor 1 is pivotally mounted rotatably on the base body 3 that is formed in the shape of a disk. This motor 1 is a geared motor that has built therein a reducer having a high gear ratio. This geared motor, during the absence of power supply, fulfills the function of self-locking the drive shaft 2. In this case, the drive shaft 2 rotates jointly with the motor 1.

This motor 1 has attached to the lower part thereof the fastening projection (a fastening piece in the present example) 4 and a stopper 4a. By having this fastening piece 4 joined to the fastening part (a fastening depression in the present example) 7 formed on the inner periphery of the cover main body 10 and the stopper 4a joined to a projection 3e formed on the upper face of the base body 3, the motor 1 can be manually operated through an angle in a predetermined range of 180 degrees or 80 degrees, for example.

Further, as another example of the rotary stopper for use during the manual operation, there may be adopted a construction which has the base body 3 provided with a projecting pin, has this pin adapted to be guided by an arcuate guide groove formed on the cam 18 through an angle of 90 degrees or 180 degrees, and has the terminal part of the guide groove function as a stopper.

The cover main body 10 is furnished with the fastening curved face 9 enabling the outer face thereof to be easily gripped, and is disposed so as to be prevented by a fastening mechanism 20 from producing any rotation. This fastening mechanism 20 is disposed so as to render the cover main body 10 incapable of producing any rotation relative to the base body 3 by causing a projection 3e formed on the upper face of the base body 3 to be meshed (engaged) with the fastening part 7 in the cover main body 10.

Further, a pair of notched grooves 21 are formed on the lateral face of the base body 3, a convex part 21a is disposed midway above the notched grooves 21, an outer peripheral groove 3f furnished with an upper convex part 21b and parallel (i.e., concentric) to the notched grooves 21 is formed on the lateral face of the base body 3 above the convex part 21a, and a projection 10f formed on the cover main body 10 after the cover main body 10 has been moved upward is bailed out of the notched groove 21 on the lower side and fastened to the outer peripheral groove 3f. In the resultant construction, the cover main body 10 can be rotated relative to the base body 3. In this case, the construction may be so modified that the cover main body 10 may be moved downward and allowed to rotate in the outer peripheral groove at a lower position. Incidentally, by providing this outer peripheral groove 3f with a stopper part not shown in the diagram, it is possible to use the cover main body 10 as a stopper in the range of rotation attained by manual operation.

Reference numeral 16 shown in the diagram denotes an annular insertion groove formed on the outer peripheral lateral face of the base body 3. By having an O-ring 17 set in the insertion groove 16, the cover main body 10 can be retained in a sealed state. Further, by having the cylindrical resinous cam 18 pivotally mounted in the upper part of the drive shaft 2 and fixed so as to be rotated jointly with the drive shaft 2, the depressions (or projections) 18a formed on the outer peripheral face of the cam 18 at angular intervals of 180 degrees or 90 degrees, and the two or three limit switches 19 arranged at a proper interval on the upper face of the base body 3 so as to be applied to the two-way or three-way valve, it is possible to induce collision of the contact point of the limit switch 19 with the depression 18a of the cam 18 due to the rotation of the cam 18 and, consequently, attain necessary electric switching. A supporting part 3g disposed on the upper face of the base body 3 fulfills the purpose of supporting the motor 1.

Figure 21:
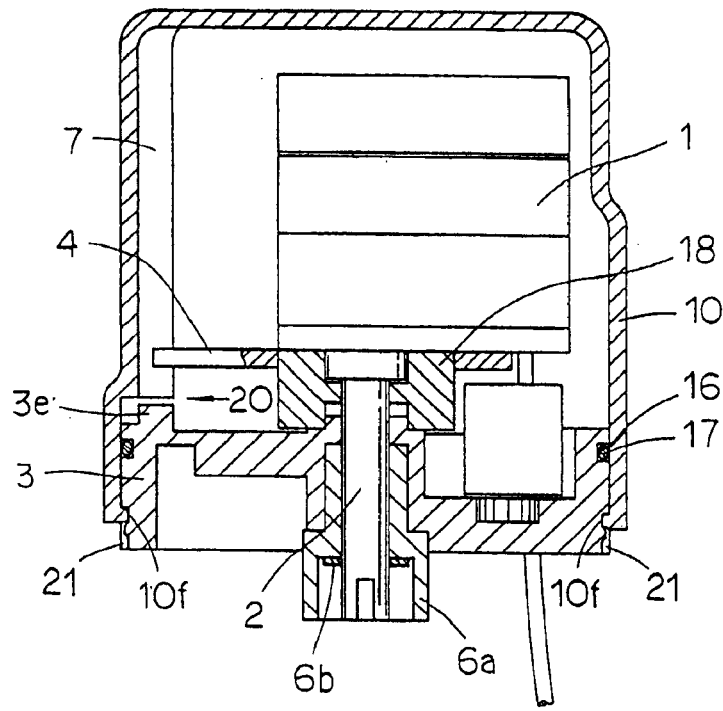
FIG. 21 is a longitudinal side view of the electric actuator of FIG. 20.
Figure 22:
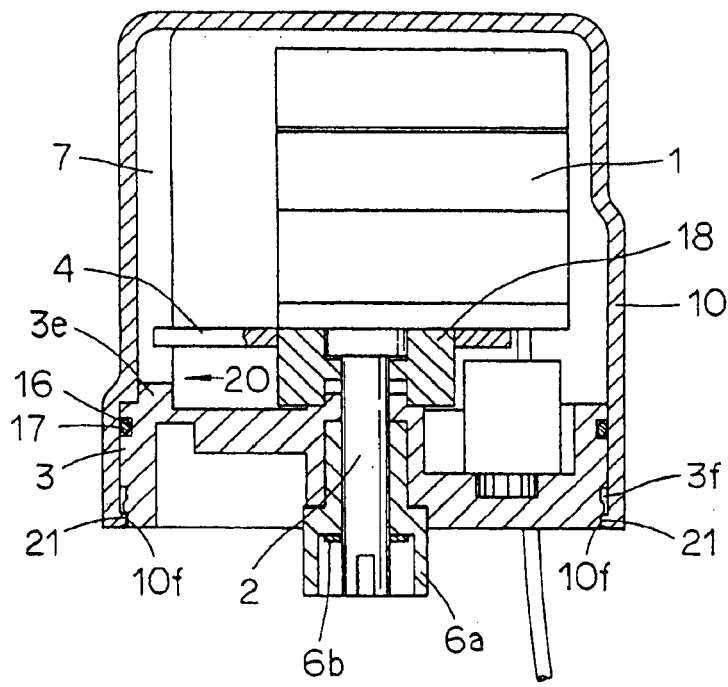
FIG. 22 is a longitudinally sectioned side view illustrating the state of an electric motion initiated in the actuator of FIG. 21 by lowering the cover main body.
Figure 23:
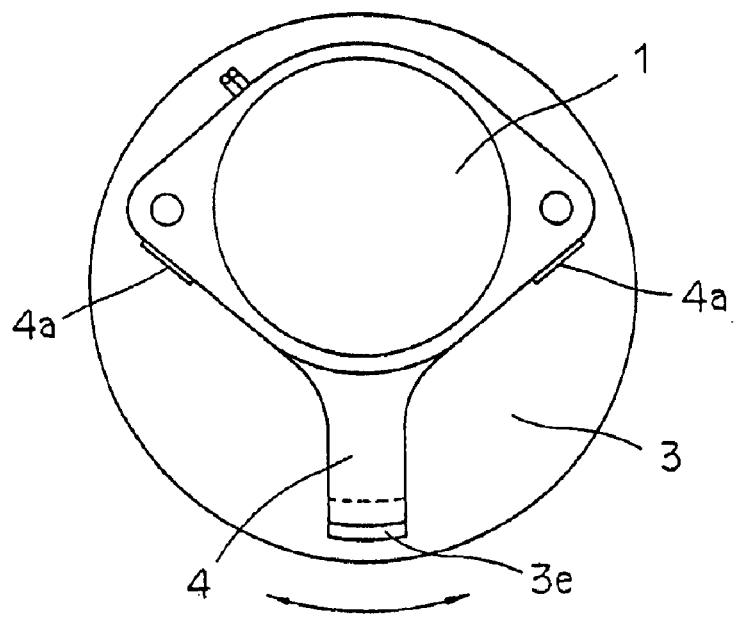
FIG. 23 is an explanatory plan view illustrating the cover main body in a separated state.
Figure 24:
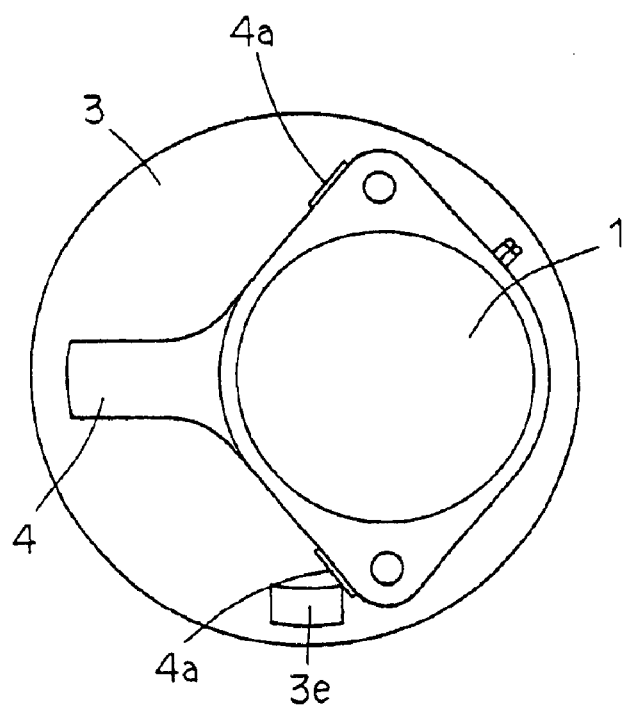
FIG. 24 is an explanatory plan view illustrating the motor main body of FIG. 23 in a rotated state.
Figure 25:
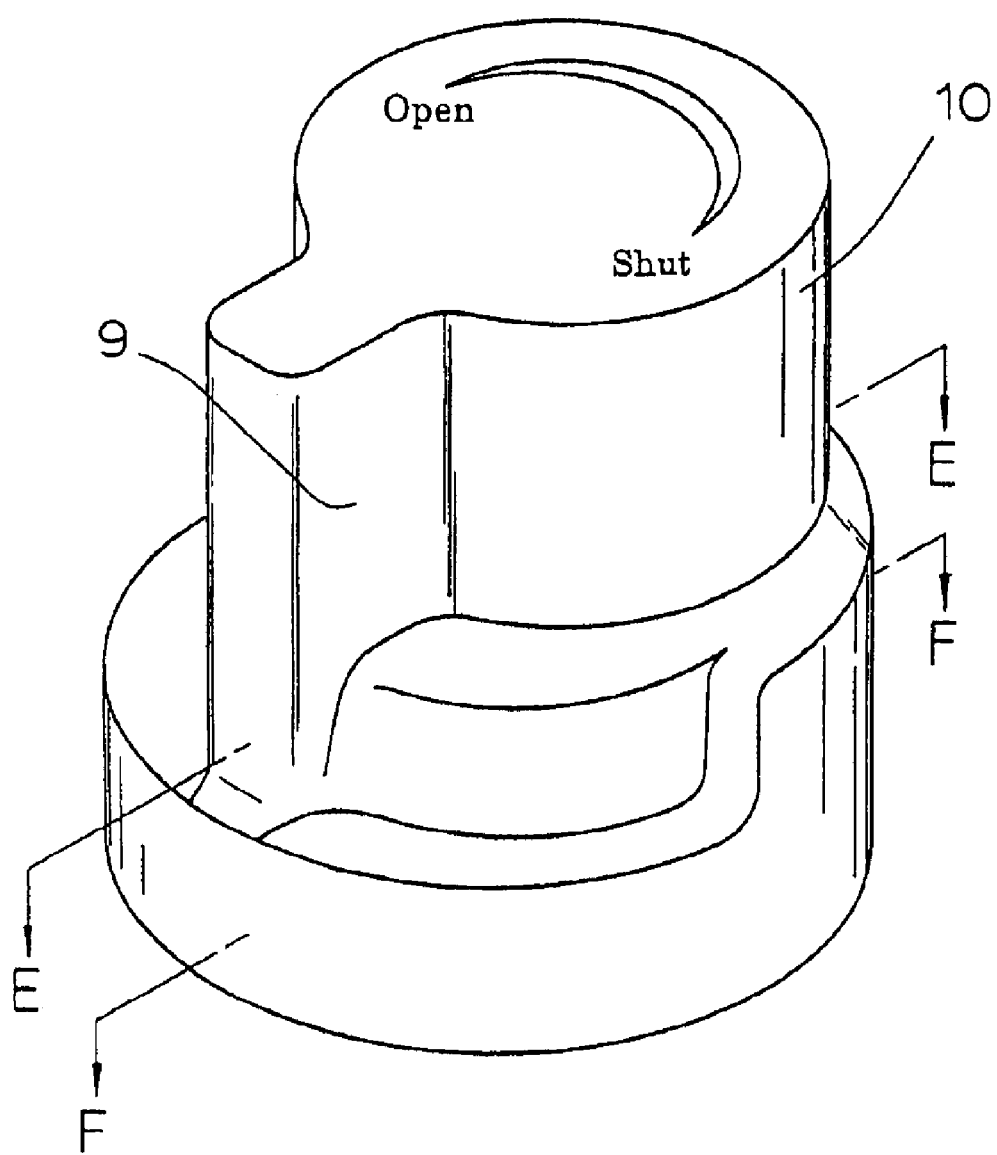
FIG. 25 is a perspective view of the cover main body.
Figure 26:
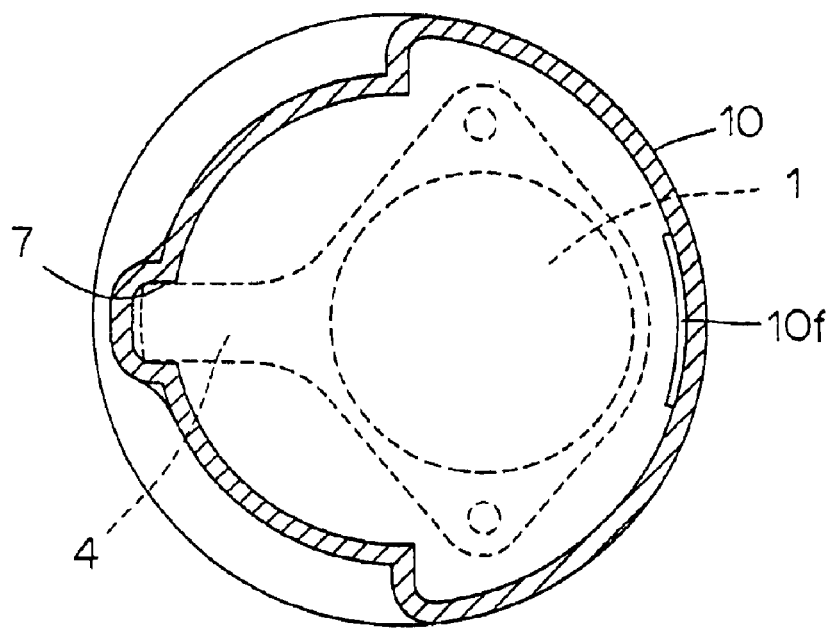
FIG. 26 is a cross section taken through FIG. 25 along line E—E.
Figure 27:
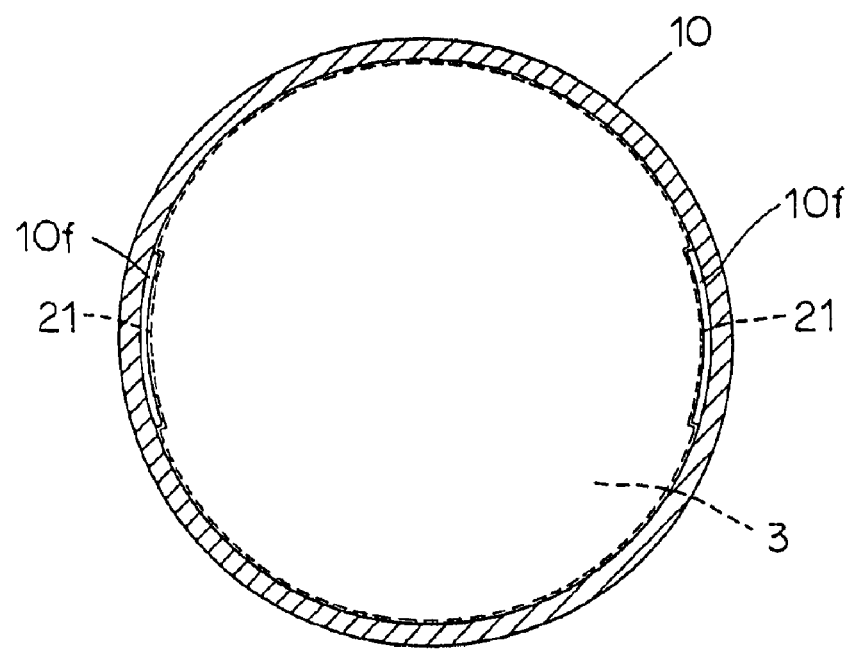
FIG. 27 is a cross section taken through FIG. 25 along line F—F.
Figure 28:
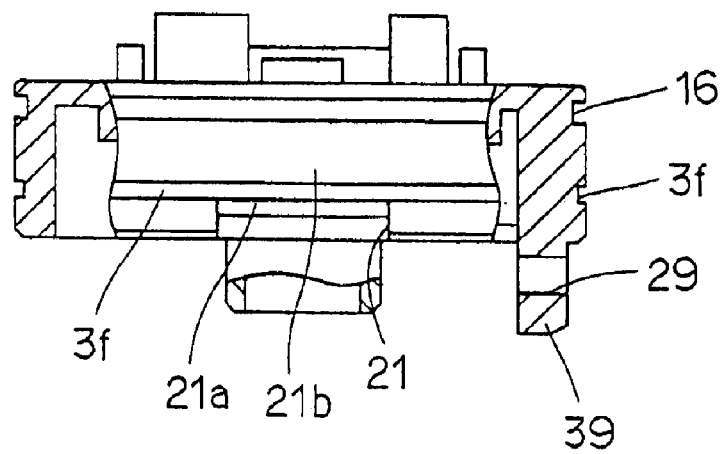
FIG. 28 is a partially cutaway front view illustrating a base body.
Figure 29:
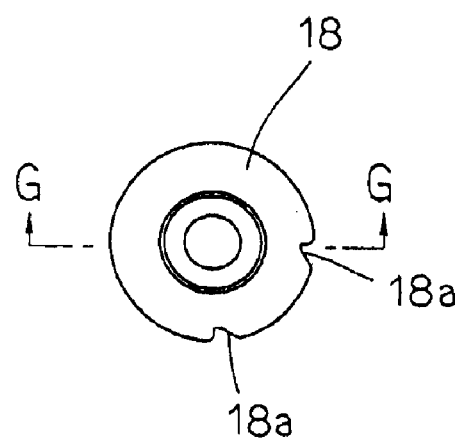
FIG. 29 is a plan view of the cam.
Figure 30:
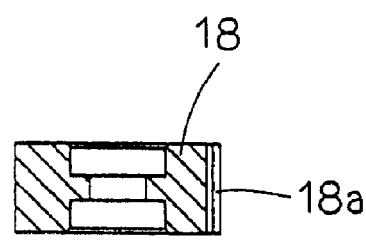
FIG. 30 is a cross section taken through FIG. 29 along line G—G.

With reference to FIG. 21, the drive shaft 2 is prevented from accidental slippage by pivotally mounting in a rotatable manner the lower part of the drive shaft 2 on a removable tubular part 6a fixed in the lower part of the base body 3, and by pivotally mounting a cover ring 6b inside the removable tubular part 6a as well. The removable tubular part 6a may be otherwise disposed integrally with the base body 3. The gear tube 24 of the rotary valve 23, such as a ball valve or a butterfly valve, is restrained from producing rotation in one direction by having the annular one-way clutch (roller clutch) 25 disposed in the gear tube 24 thereof and the removable tubular part 6a inserted into the clutch 25.

In addition, the gear tube 24 is prevented from producing rotation in the other direction by causing the stopper part 26 disposed on the lateral face of the gear tube 24 to collide against the colliding face 27 formed on the base body 3 as illustrated in FIG. 20. Alternatively, the rotation may be controlled by causing the stopper pin mechanism 28 disposed on the base body 3 to engage a projection (not shown in the diagram) of the gear tube 24.

With reference to FIG. 20, the stopper pin mechanism 28 is disposed in the insertion hole 29 of a fastening piece 39 suspended from the lower part of the base body 3 so as to be removed through the spring 33 energized by being pivotally mounted on the fitting plate 32 connected to the stopper pin 31 provided at the outer terminal thereof with the head part 30. The leading terminal part (distal end) of the stopper pin 31 engages the stopper part 26 so that the rotary valve 23 and the electric actuator may be infallibly prevented from moving relative to each other in the vertical direction. Meanwhile, when the stopper pin 31 is extracted outward, the stopper pin 31 can be removed from the stopper part 26 and, in the ensuant state, the electric actuator can be taken out of the valve in one stroke.

The stopper pin mechanism 28 is disposed so that the leading terminal part of the stopper pin 31 may be fastened to (engage) the lower face of the stopper part 26 at the position at which the stopper part 26 collides against the colliding face 27.

Reference numeral 34 in the diagram denotes the ball disposed inside the body 23a of the ball valve (rotary valve) 23 and furnished with the through hole 34a. Reference numeral 35 denotes the stem and numeral 36 denotes a ball seat, and they are joined to each other by fitting the convex dihedral part 38 formed at the upper terminal of the stem 35 to the convex dihedral part 37 formed at the lower terminal of the drive shaft 2.

Though the use of the geared motor has been described as a means to self-lock the drive shaft 2 to the motor during the absence of power supply, this means does not need to be limited to the geared motor. It is possible to use a clutch structure or an electric brake instead.

As the electric actuator begins operating, the drive shaft 2 of the motor 1 begins to rotate and causes the stem 35 of the ball valve 23 to rotate. At the same time, the cam 18 begins to impart motion to the limit switch 19 and make and break the electric current to the motor 1 so that the rotation of the ball 34 of the ball valve 23 may be stopped at a position after a predetermined degree of valve opening.

In this case, the motor 1 is in such a state as induces the fastening projection piece 4 disposed in the lower part of the motor to be attached to the fastening depression 7 of the cover main body 10, and the cover main body 10 is fixed in a manner incapable of producing motion through the fastening mechanism 20 originating in the fastening of the projection 3e formed on the upper face of the base body 3 to the fastening depression 7. Therefore, the motor 1 transmits the rotation of the drive shaft 2 to the stem 35 and opens and shuts the valve without producing its own rotation.

Subsequently, the cover main body 10 can be gripped and then pulled more or less upward with the object of obtaining the manual operation of the electric actuator in case of emergency due to power failure by disengaging fastening mechanism 20, including projection 3e and fastening part 7. In this case, projecting part 10f will be able to ride over the convex part 21a by virtue of the resinous elasticity of the cover main body 10 and assume a position in the outer peripheral groove 3f disposed above and parallel (concentric) to the notched groove 21. When the cover main body 10 having the shape of a manual gas tap is gripped and turned in the state consequently assumed, the fastening projection piece 4 of the motor in a state fastened to the fastening depression 7 of the cover main body 10 will be rotated jointly with the motor 1. At the same time, the drive shaft 2 will be simultaneously rotated to open and shut the rotary valve 23. In this case, since the stopper 4a is engaged with the projection 3e disposed on the upper face of the base body 3 due to the rotation of the motor at a predetermined angle of 180 degrees or 90 degrees, the manual operation of the rotary valve 23 will be attained within the predetermined range of angle.

The projecting part 10f of the cover main body 10 is rotated to the position of the notched groove 21, and the cover main body 10 is then moved downward to return to the power supply mode. The power supply mode returns because the fastening mechanism 20 causes the cover main body 10 to be fastened to (engage) the base body 3.

Figure 31:
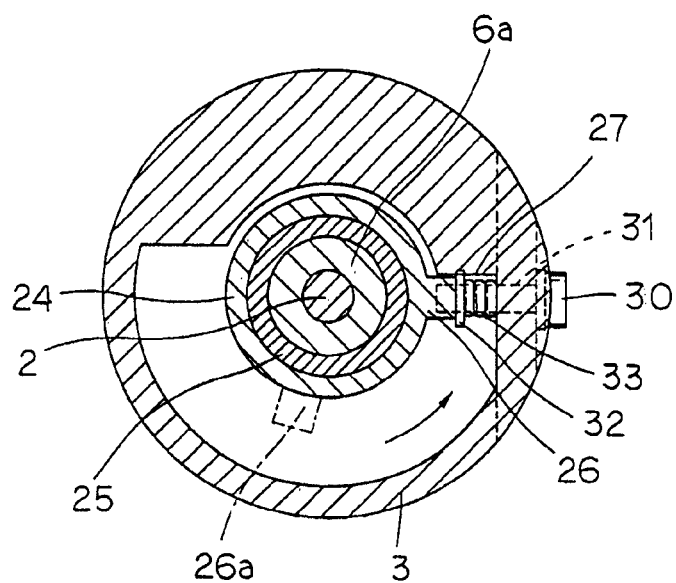
FIG. 31 is a cross section taken through FIG. 20 along line D—D.

The fitting of the electric actuator in one stroke is attained by inserting the removable tubular part 6a into the one-way clutch 25 in the gear tube 24 where the stopper part 26 assumes an arbitrary position, such as that of a component 26a as illustrated in FIG. 31, for example, and rotating the gear tube in the direction capable of producing rotation. When the concave dihedral part 37 of the drive shaft and the convex dihedral part 38 of the stem coincide in the dihedral direction during the course of the rotation, the concave dihedral part 37 of the drive shaft is automatically inserted on the convex dihedral part 38 of the stem.

Further, when the removable tubular part 6a is more or less rotated until the stopper part 26 of the gear tube 24 collides against the colliding face 27 of the base body 3, the electric actuator is prevented from continuing its motion in the direction of rotation. At the same time, the electric actuator is infallibly prevented from continuing its motion in the vertical direction because the leading terminal (distal end) of the stopper pin 31 is engaged with the lower face of the stopper part 26 due to the bias force of the spring 33.

The stopper pin 31 is extracted outward and released from the state of engagement in the vertical direction to accomplish the removal of the electric actuator. Since the removable tubular part 6a can be consequently extracted upward through the one-way clutch 25, the electric actuator can be removed easily from the valve at one stroke.

The fixing structures of the electric actuators in other aspects of this invention are illustrated in FIGS. 32 to 45. Concerning the fixing structures of the electric actuator in this invention, the like parts found in these fixing structures and in those of the former aspect of this invention will be denoted by like reference numerals and will be omitted from the following description. An example of applying this invention to the fixation of the axial mounting part of the ball valve to the electric actuator will be described in detail below with reference to the accompanying drawings.

Figure 32:
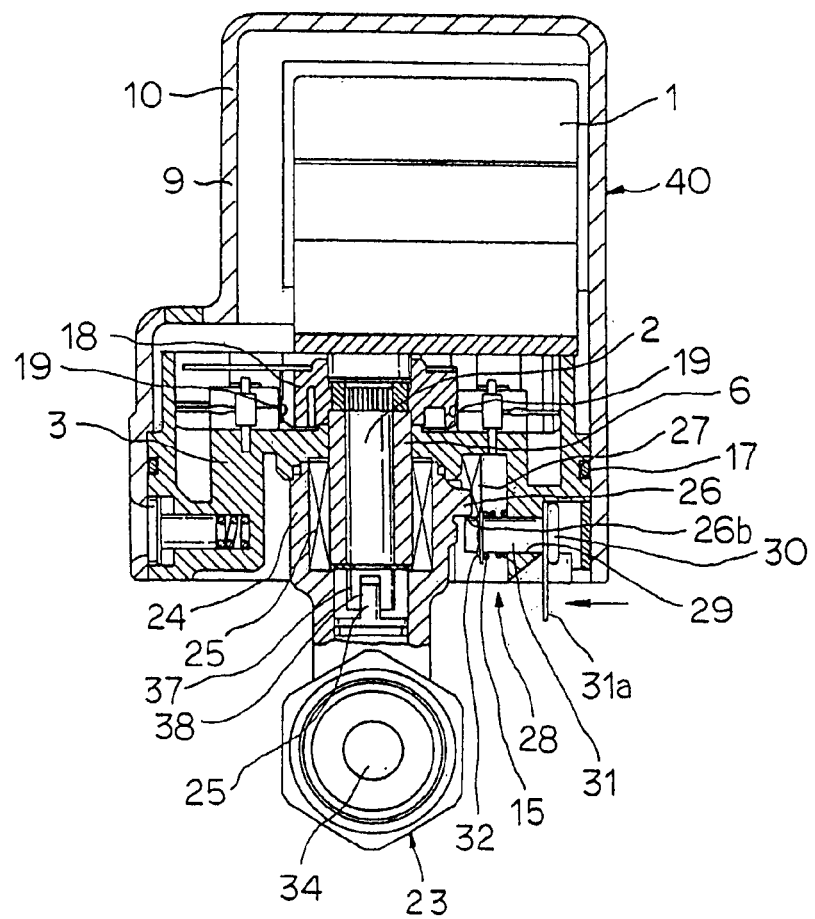
FIG. 32 is a longitudinal cross section illustrating the state of the electric actuator fixed to the ball valve, representing one example of the structure of fixing the electric actuator in another aspect of this invention.

With reference to FIG. 32, the drive shaft 2 of the motor 1 is pivotally mounted rotatably on the base body 3 formed in the shape of a disk. This motor 1 is a geared motor that has built therein a reducer having a high gear ratio. This geared motor, during the absence of power supply, fulfills the function of self-locking the drive shaft 2. In this case, the drive shaft 2 that is provided in the lower terminal thereof with the concave dihedral part 37 is disposed so that it can be rotated jointly with the motor 1, and this drive shaft 2 is rotatably inserted in the fitting tube 6 that is fixed to the base body 3. The electric actuator 40 of this example is provided at the position of fixture with the fitting tube 6 that is a part of an annular plane.

Reference numeral 23 denotes the rotary valve, such as a ball valve or a butterfly valve. This rotary valve 23 is provided at the fixing position of the gear tube 24 thereof with the annular one-way clutch 25.

Figure 33:
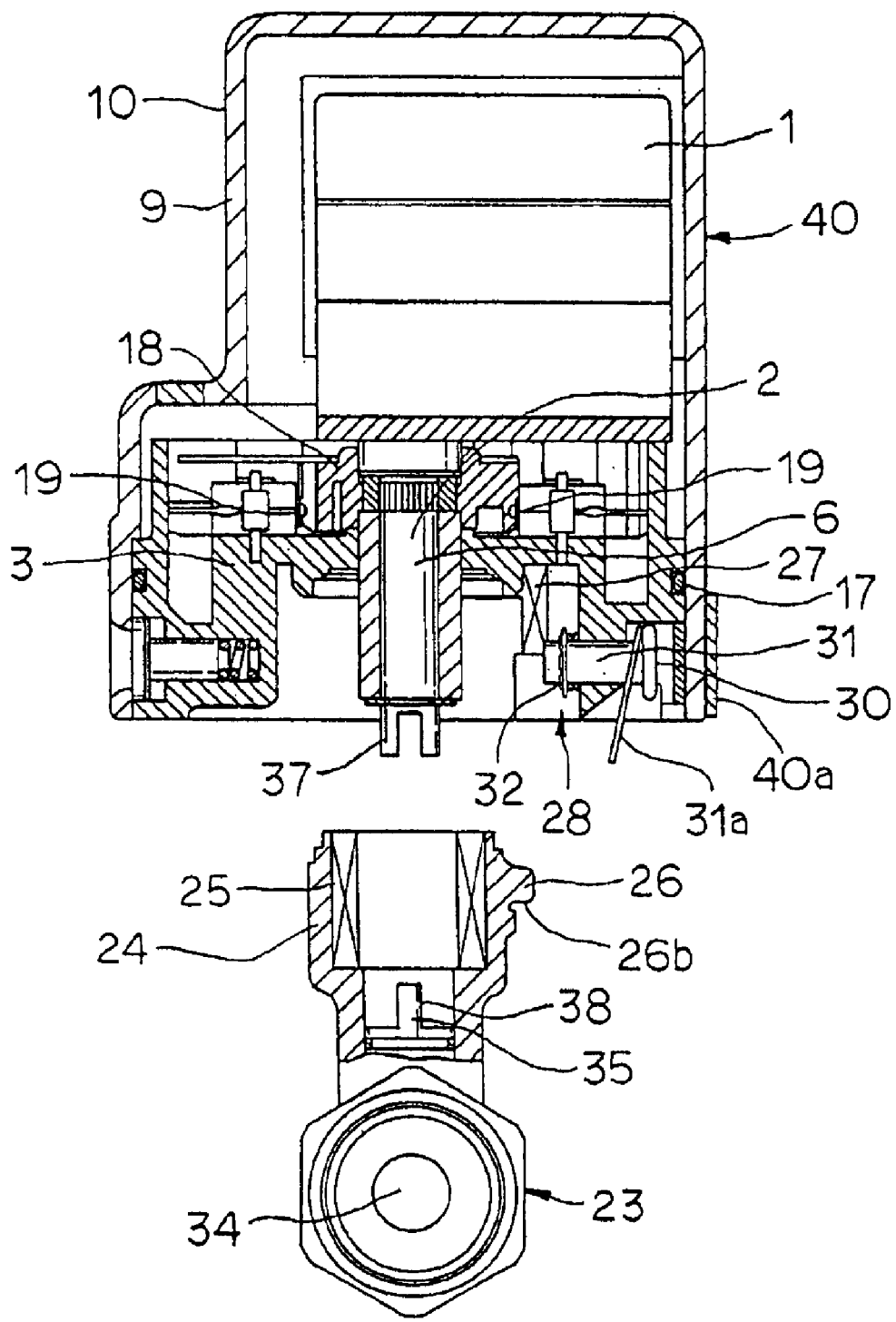
FIG. 33 is a longitudinal cross section illustrating the electric actuator of FIG. 32 in a separated state.
Figure 36:
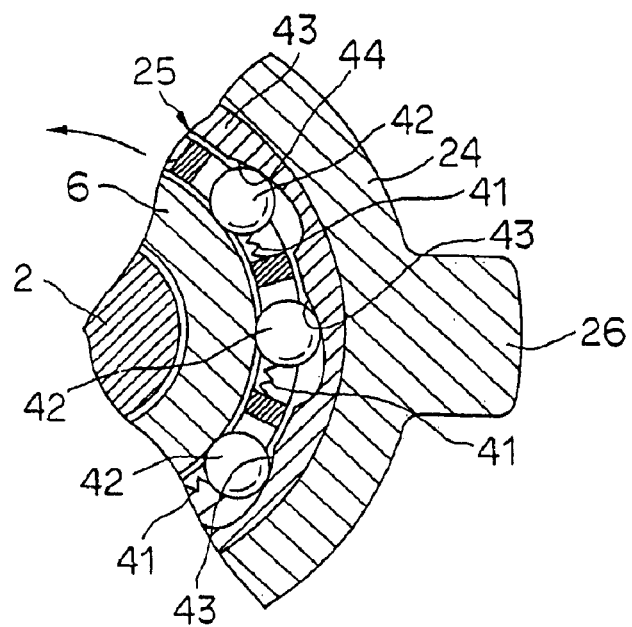
FIG. 36 is a partially cutaway, magnified cross section illustrating one example of the structure of a roller clutch
Figure 37:
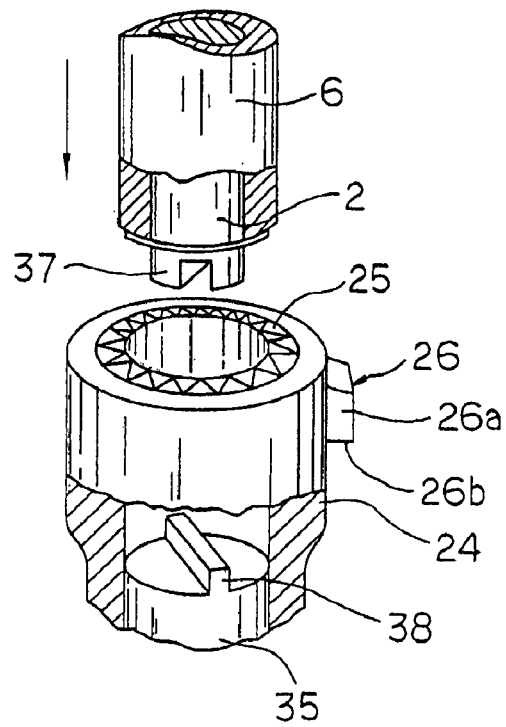
FIG. 37 is a partially cutaway perspective view illustrating the state of a rotary valve readied to be fixed to the actuator.

Specifically, the first restraining means for restraining the rotation of the rotary valve 23 in one circumferential direction is formed by fixing the annular one-way clutch (roller clutch, in the present example) 25 illustrated in FIG. 36 and FIG. 37 in the gear tube 24 of the rotary valve 23 as illustrated in FIG. 32 and FIG. 33 so as not to be able to rotate, and by inserting into this clutch 25 the fitting tube 6 which has the drive shaft 2 compacted therein.

The annular one-way clutch 25 illustrated in FIG. 36 depicts one concrete example and does not need to be restricted thereto. It may embrace other clutch structures.=

In the roller clutch 25 illustrated in this diagram, when an outer race 43 of the roller clutch 25 happens to be fixed in the gear tube 24 and the fitting tube 6 tends to rotate counterclockwise in the bearings of the diagram relative to the gear tube 24, the clutch 25 relies on the force of a spring 41 to advance a roller 42 to the meshing position of the outer race cam face 44, and then relies on the wedging action of the cam face 44 with the fitting tube 6 to restrain in a locked state the rotation in one circumferential direction (in the counterclockwise direction in the bearings of the diagram of FIG. 36) of the fitting tube 6 and the gear tube 24 that is disposed on the electric actuator 40 or the rotary valve 23 or both. Incidentally, since the gap between the outer periphery of the fitting tube 6 and the inner periphery of the roller clutch 25 is set so as to be very narrow, the wedging action mentioned above immediately manifests itself and produces the locked state without entailing any deviation at all in the direction of rotation when the gear tube 24 tends to rotate clockwise as mentioned above.

Figure 38:
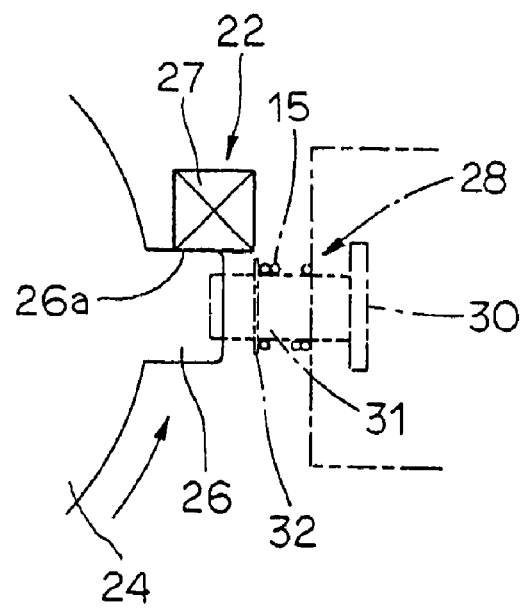
FIG. 38 is an explanatory plan view illustrating a fastening structure and a stopper pin structure contemplated in another aspect of this invention.
Figure 39:
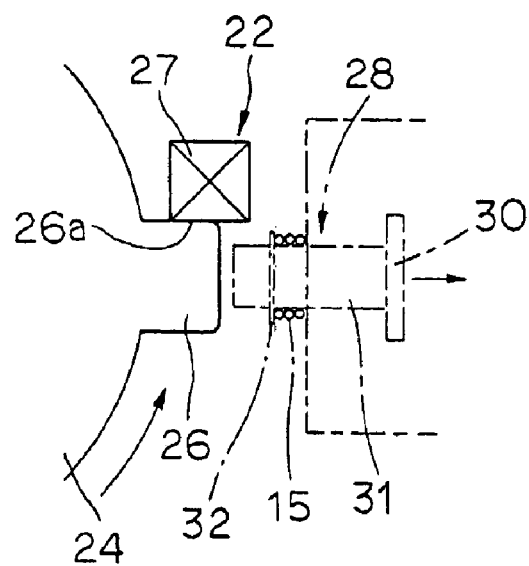
FIG. 39 is an explanatory plan view illustrating the stopper pin structure of FIG. 38 in a released state.

FIG. 38 and FIG. 39 illustrate one example of the provision of the electric actuator 40 and the rotary valve 23 for both the electric actuator 40 and the rotary valve 23 as contemplated in this invention.

First, a fastening mechanism 22 includes a stopper part 26 integrally disposed on one side, such as the lateral face of the gear tube 24, for example, and the colliding face 27 formed on the other side, namely on the base body 3. Due to the engagement of the stopper part 26 with the colliding face 27 in consequence of the rotation in the opposite direction from that of FIG. 36 (i.e. the clockwise direction), the second restraining means for restraining the rotation in the same direction is formed.

Now, the stopper pin mechanism 28 that restrains these two components from being inserted into and extracted from each other in the axial direction will be described below.

With reference to FIG. 32 and FIG. 33, the stopper pin 31 furnished with the head part 30 is disposed in the insertion hole 29 formed in the lower part of the base body 3 so as to be removable from base body 3, and the spring 15 is energized by being mounted on the fitting plate 32. The stopper pin 31 is disposed so that the leading terminal part thereof assumes a position fit for attachment to the lower face of the stopper part 26 at the position at which the stopper part 26 collides with the colliding face 27. The leading terminal part (distal end) of the stopper pin 31 engages the lower face of the stopper part 26 as illustrated in FIG. 32 and FIG. 38 so as to prevent the rotary valve 23 and the electric actuator 40 from being moved in the vertical direction (the axial direction) relative to each other.

Further, the stopper pin mechanism 28 is provided with an operating piece 31a that is formed of a thin sheet and adapted to facilitate extraction of the stopper pin 31. By depressing the operating piece 31a raised from the bottom part of the base body 3 inwardly in the bearings of the diagram of FIG. 32 and consequently causing the levering action of the operating piece 31a to move the stopper pin 31 outward until departure from the stopper part 26, the electric actuator 40 in the ensuant state can be removed in one stroke from the rotary valve 23.

Reference numeral 10 in the diagram denotes the cover main body of the electric actuator 40 which is furnished with the fastening curved face 9 intended to enable the outer face thereof to be easily gripped. Reference numeral 17 denotes the O ring, numeral 18 denotes the cam fixed on the drive shaft 2 and removably disposed on the limit switch 19, numeral 34 denotes the ball of the ball valve 23, and numeral 35 denotes the stem provided at the upper terminal thereof with a convex dihedral body part 38.

The removal of the rotary valve 23 from the electric actuator 40 in the state illustrated in FIG. 32 is accomplished by pressing the operating piece 31a in the direction of the arrow mark in the diagram, thereby moving the stopper pin 31 outward until the leading terminal part (distal end) of the stopper pin 31 departs (disengages) from the stopper part 26 and the two components are released from the state of restraint in the axial direction. Thus, by keeping hold of the cover main body 10 of the electric actuator 40 and pulling it upward in the bearings of the diagram of FIG. 32, it can be removed in one stroke into the state illustrated in FIG. 33.

Figure 34:
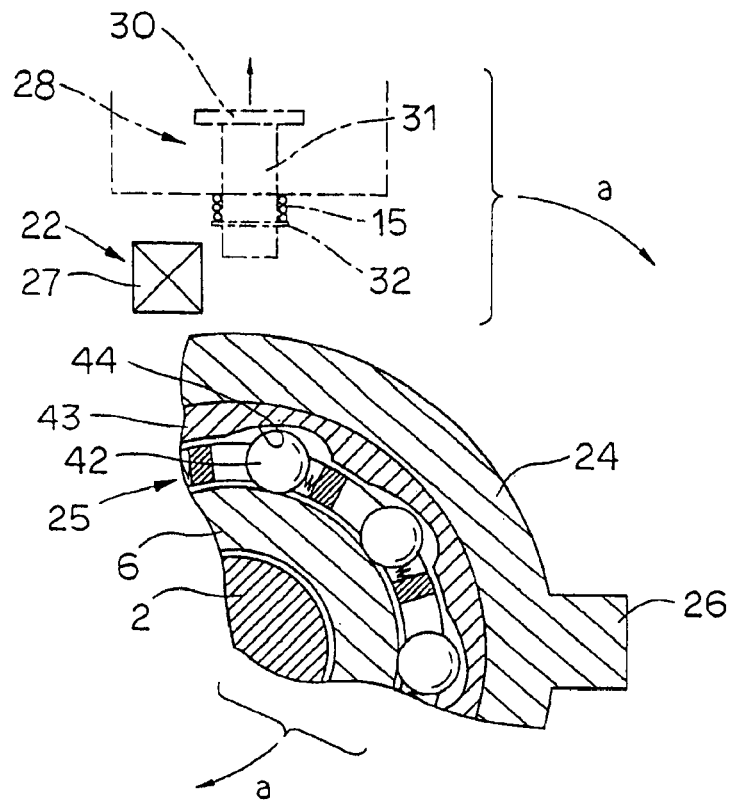
FIG. 34 is an explanatory diagram illustrating the actuator in a state readied for rotation.

Then, the attachment of the electric actuator 40 to the rotary valve 23 is accomplished by first keeping hold of the cover main body 10 of the electric actuator 40 and, with the colliding face 27 formed on the base body 3 separated from the stopper part 26 of the rotary valve 23 as illustrated in FIG. 34, inserting the fitting tube 6 of the electric actuator 40 into the roller clutch 25. At this time, since the roller 42 of the roller clutch 25 is separated from the cam face 44 of the outer race 43, the fitting tube 6 is not locked in the direction of the arrow mark a in FIG. 34 but allowed to form the first retraining means for restraining the electric motor 40 and the rotary valve 23 from rotating in one direction.

Incidentally, the insertion of the fitting tube 6 in the roller clutch 25 is continued until the terminal part of the drive shaft 2 collides with the terminal part of the stem 35. Then, by setting the rotation angle between the colliding face 27 and the stopper part 26 in the first fastening means 90° (90° or above where the rotary valve 23 is a valve having an opening angle of 90°) or 180° (180° or above where the rotary valve 23 is a valve having an opening angle of 180°), the engagement of the drive shaft 2 and the stem 35 which will be specifically described herein below is carried out smoothly. It is commendable to indicate this distance of separation by putting up on the lateral face of the electric actuator 40 a display part 40a, such as the mark using the stopper part 26 of the rotary valve 23 as the standard as illustrated in FIG. 33.

Figure 35:
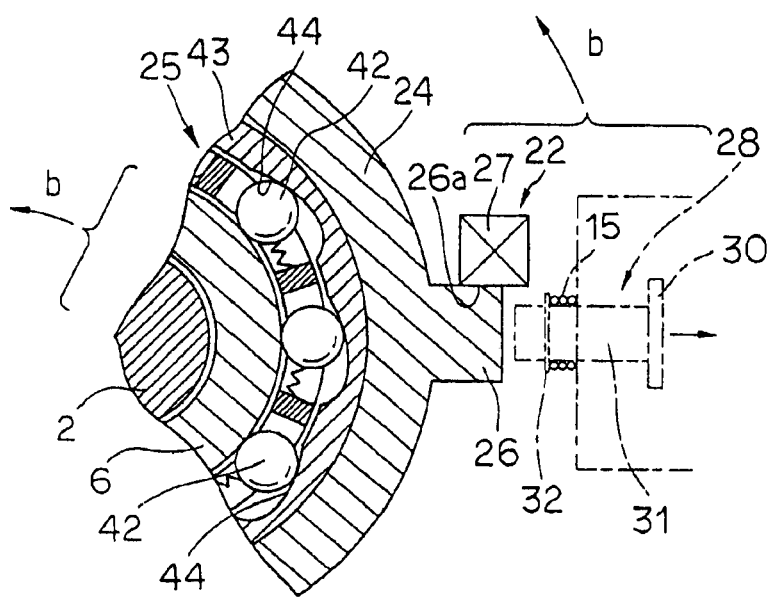
FIG. 35 is an explanatory diagram illustrating the actuator in a fastened state.

Then, the electric actuator 40 (inclusive of the fitting tube 6 and the colliding face 27) is rotated in the direction of the arrow mark a in the bearings of the diagram of FIG. 34 until the colliding face 27 collides with a lateral face 26a of the stopper part 26 of the rotary valve as illustrated in FIG. 35. Consequently, the fastening mechanism 22 that restrains the electric actuator 40 and the rotary valve 23 from being rotated in another direction, namely the second restraining means, is formed.

During the rotation of the electric actuator 40, the concave dihedral part 37 and the convex dihedral part 38 are fastened, and the drive shaft 2 and the stem 35 are joined infallibly by forcing the fitting tube 6 further inward at the time that the direction of the concave dihedral part 37 of the drive shaft 2 and the direction of the convex dihedral part 38 of the stem 35 are aligned. During the insertion of the fitting tube 6 into the one-way clutch 25, therefore, it is not always necessary to have the direction of the concave dihedral part 37 of the drive shaft 2 and the direction of the convex dihedral part 38 of the stem 35 aligned in advance.

An attempt to rotate the electric actuator 40 (inclusive of the fitting tube 6 and the colliding face 27) in the direction of the arrow mark b in the bearings of the diagram of FIG. 35 results in instantaneously advancing the roller 42 of the roller clutch 25 to the meshed position of the cam face 44 of the outer race 43 and inducing the cam face 44 and the fitting tube 6 to generate a wedging action. Thus, the gear tube 24 cannot be rotated in the direction of the arrow mark b in the bearings of the diagram of FIG. 35.

Likewise, an attempt to rotate the electric actuator 40 (inclusive of the fitting tube 6 and the colliding face 27) in the opposite direction of the arrow mark a in the bearings of the diagram of FIG. 34 (the clockwise rotation) results in the wedging action mentioned above being retained, and causes the lateral face 26a of the stopper part 26 to collide with the colliding face 27. Thus, the gear tube 24 is restrained from being rotated in either direction.

Since the wedging action is generated substantially at the same time that the lateral face 26a of the stopper part 26 collides with the colliding face 27, the electric actuator 40 is locked fast to the rotary valve 23 without entailing any deviation of rotation in either of the directions at the time that the second restraining means is formed.

When the operating piece 31a is then let go, the electric actuator 40 and the rotary valve 23 are subjected to restraint of motion in the axial direction. Motion in the vertical direction is restricted because the spring 15 thrusts the stopper pin 31 outward and brings it into contact with a lower face 26b of the stopper part 26.

The rotation of the rotary valve 23 and the electric actuator 40 in both the circumferential directions, therefore, is perfectly restrained because the rotation thereof in one of the directions is restrained by the first restraining means using the roller clutch 25 and in the other direction by the second restraining means formed by the engagement of the stopper part 26 and the colliding face 27. Further, the electric actuator 40 and the rotary valve 23 succumb to the restraint exerted by the stopper pin mechanism 28 in the axial direction. They can consequently be fixed infallibly because their rotational motion in both directions and their motion in the axial direction are restrained.

Thus, the rotary valve and the electric actuator can be attached and detached by one stroke.

Though the preceding example has been described with respect to the case of effecting attachment and detachment of the rotary valve and the electric actuator, this invention does not need to be limited to this particular case. It may be applied, for example, to the case of effecting attachment and detachment of a pair of component members of a varying mechanical part. Thus, this invention finds a wide range of utility.

Figure 40:
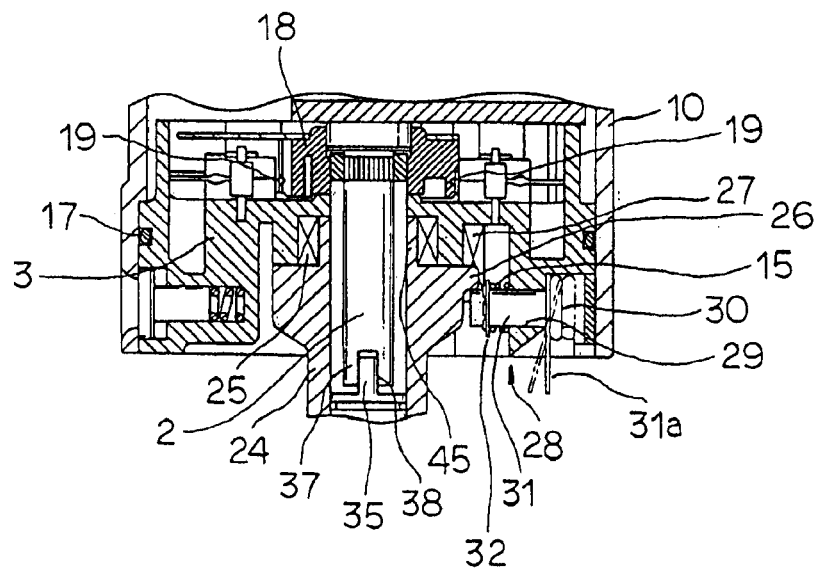
FIG. 40 is a partially cutaway cross section illustrating another example of the actuator shown in FIG. 32 and FIG. 33.

FIG. 40 illustrates another example of fixing the electric actuator 40 and the rotary valve 23 contemplated by this invention. In this example, the annular one-way clutch 25 is disposed on the base body 3 side, an annular face part 45 is disposed in the upper part of the gear tube 24 of the rotary valve 23, and the annular face part 45 is inserted into and extracted from the clutch 25. The construction of this example except for the points just mentioned is identical with that of the preceding example, and it is further identical therewith in terms of operation and effect.

Figure 41:
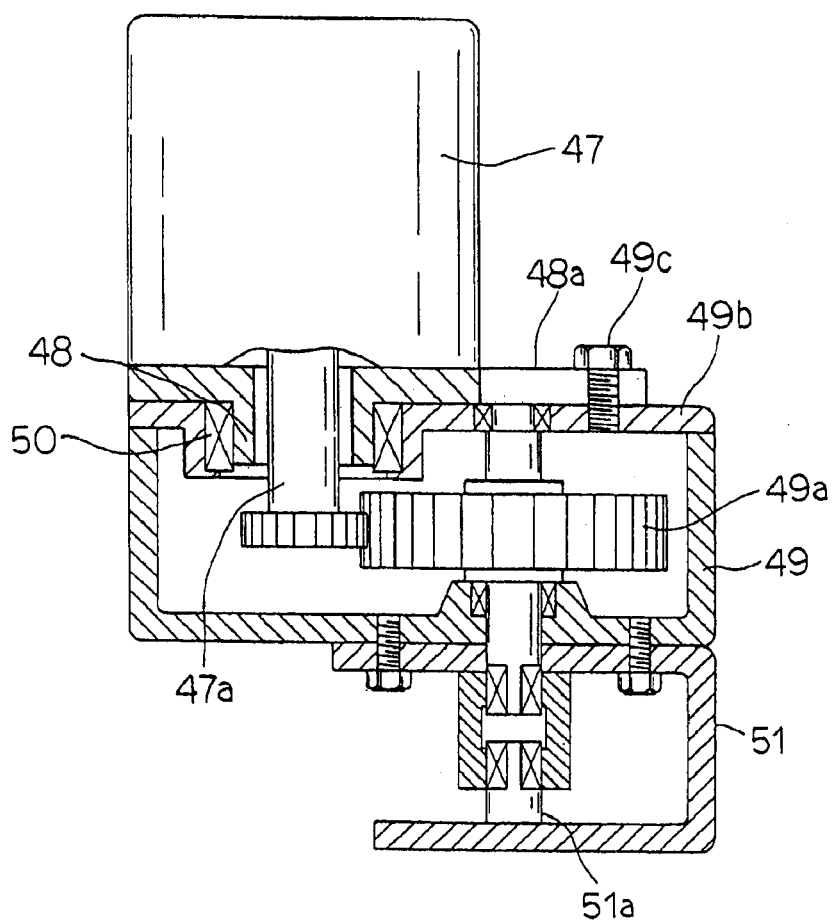
FIG. 41 is a cross section illustrating another example of the electric actuator according to another aspect of this invention.
Figure 42:
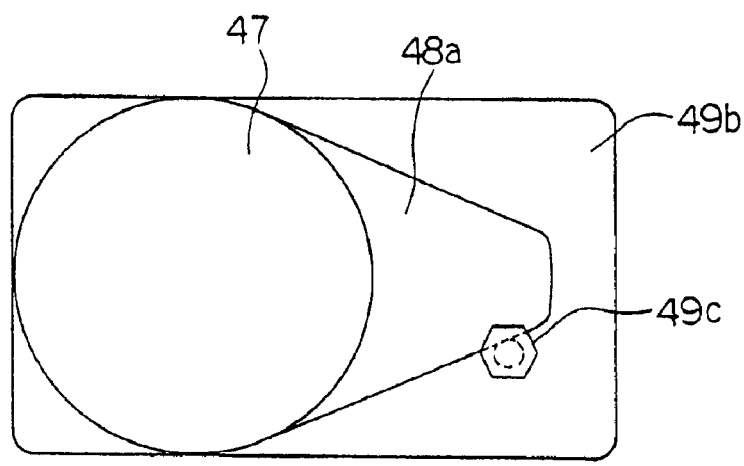
FIG. 42 is a plan view of FIG. 41.

FIG. 41 and FIG. 42 illustrate still another example of the fixing structure contemplated by this invention. In this example, an annular face part 48 is disposed on the outer periphery of an output shaft 47a of an electric actuator 47, an annular one-way clutch 50 is disposed on a lid part 49b of a gear case 49 having a gear 49a and other components built therein, and this clutch 50 is inserted into and extracted from the annular face part 48. A flange part 48a is extended from the annular face part 48 parallel to the lid part 49b. The rotation in one direction is restrained by the collision of the lateral face of this flange part 48a against a bolt 49c screwed on the upper face of the lid part 49*b*, and the movement of the flange part 48*a* in the axial direction is obstructed by means of the head portion of the bolt 49*c*.

The present example is constructed so as to fulfill the same operation and effect as the preceding examples and to give rise to a drive mechanism for driving a drive shaft 51*a* of a valve, for example, into the gear case 49 through a bracket 51.

Figure 43:
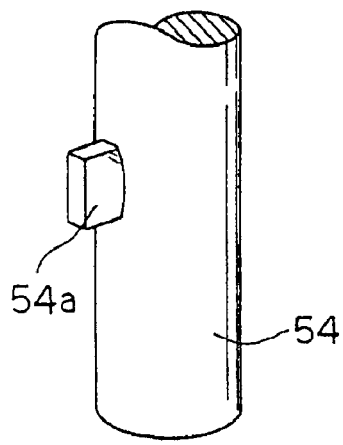
FIG. 43 is an exploded perspective view illustrating another embodiment of the fixing structure contemplated in another aspect of this invention.
Figure 43:
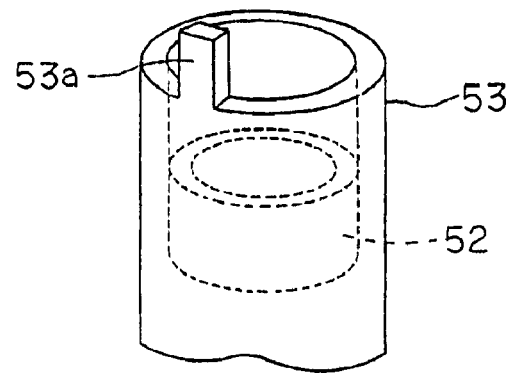
Figure 44:
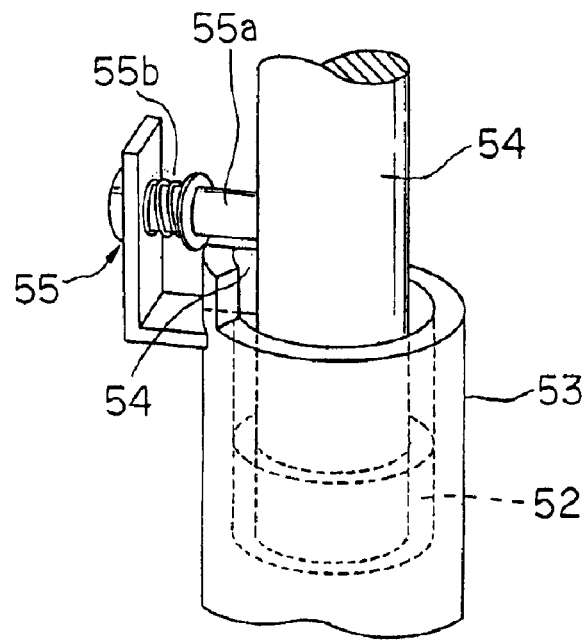
FIG. 44 is a perspective view illustrating the fixing structure shown in FIG. 43 in a fixed state.

FIG. 43 and FIG. 44 illustrate yet another example of the fixing structure contemplated by this invention. In this example, a shaft (annular face part) 54 is inserted in a tubular part 53 having an annular one-way clutch 52 built therein, and the shaft 54 is rotated until the lateral face of a convex part 53*a* of the tubular part 53 collides against the lateral face of a concave part 54*a* of the shaft 54.

Then, a stopper pin mechanism 55 fixed to the tubular part 53 and furnished with a stopper pin 55*a* and a spring 55*b* is utilized for establishing engagement of the upper terminal face of the convex part 54*a* which has collided with the convex part 53*a*. Since the tubular part 53 and the shaft 54, consequently, are restrained from being rotated in either direction and also restrained from being inserted and extracted in the axial direction as well, they can be infallibly fixed. Their removal can be performed with ease by releasing the stopper pin mechanism 55.

Incidentally, the convex part 53*a* may be a groove part formed in the upper terminal of the tubular part 53. This groove part is only required to be fastened to the convex part 53*a* of the shaft 54.

Figure 45:
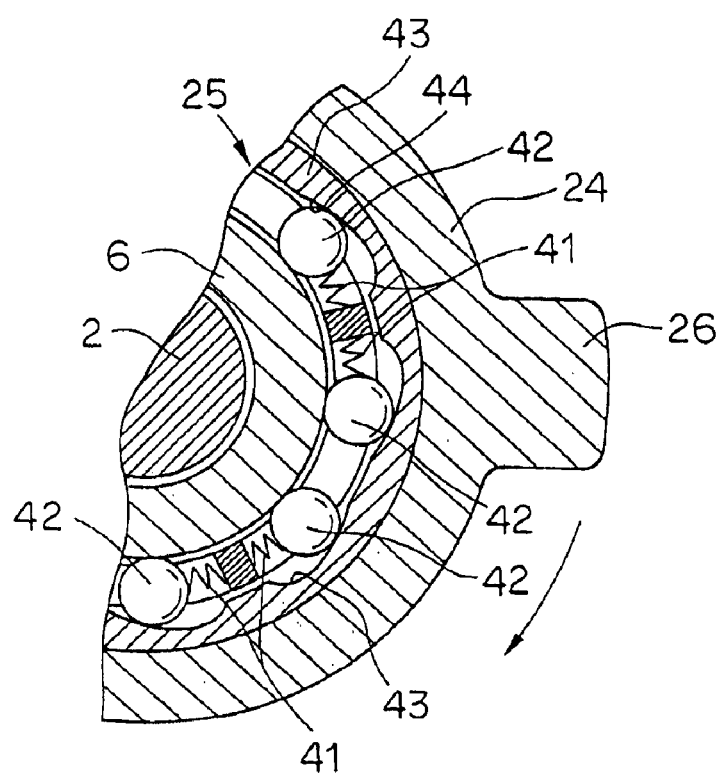
FIG. 45 is a partially cutaway, magnified cross section illustrating an example of the application of a one-way clutch.

FIG. 45 illustrates an example of the application of an annular one-way clutch in another aspect of this invention. In this example, the wedging action manifests itself in both the directions, and an annular face part is inserted into the one-way clutch structure to attain the necessary fixture in both directions.

INDUSTRIAL APPLICABILITY

This invention is ideal for an electric actuator to be mounted on a rotary valve, such as a ball valve or a butterfly valve. It warrants a liberal cut of cost because it fulfills the function of a handle that can be so gripped as to be manually operated easily, and further because it combines this function with an additional function of a switch that can be used in switching between automatic and manual operations. It exalts the efficiency of piping work, assembly work, and maintenance and, therefore, can further contribute to the reduction of cost.

Even in the fixing structure for a pair of component members, such as a rotary valve and an electric actuator, that are prone to the impartation of a rotary force, this invention can easily and infallibly fix the direction of rotation and the vertical direction (axial direction). The invention, when applied to a pair of mechanical components that are used in various other kinds of structures, presents the possibility of being utilized as the technique for fixing the rotational direction and the axial direction. The fixing structure contemplated by this invention can be extensively applied to fixing means for other mechanical parts without departing from the scope of its technical spirit.

What is claimed is:

1. A fixing structure for connecting and fixing an electric actuator and a rotary valve, comprising:

an annular one-way clutch structure at one of a pair opposite fixing positions; and an annular face part at the other of the pair of opposite fixing positions, wherein the annular face part is inserted into the one-way clutch structure, thereby restraining the actuator and valve from being rotated in one circumferential direction.

2. The fixing structure according to claim 1, wherein the annular one-way clutch has a roller clutch structure.

3. The fixing structure according to claim 2, wherein the actuator and valve have fastening mechanisms for restraining rotation of the one-way clutch structure and for restraining rotation in an opposite direction.

4. The fixing structure according to claim 2, further comprising a stopper pin mechanism for restraining insertion and extraction between the actuator and the valve in the axial direction.

5. The fixing structure according to claim 1, wherein the actuator and valve have fastening mechanisms for restraining rotation of the one-way clutch structure and for restraining rotation in an opposite direction.

6. The fixing structure according to claim 5, further comprising a stopper pin mechanism for restraining insertion and extraction between the actuator and the valve in the axial direction.

7. The fixing structure according to claim 1, further comprising a stopper pin mechanism for restraining insertion and extraction between the actuator and the valve in the axial direction.

\* \* \* \* \*